United States Patent
Wach

(10) Patent No.: US 8,532,500 B1
(45) Date of Patent: Sep. 10, 2013

(54) SYSTEM AND METHOD FOR RECEIVING OPTICAL SIGNALS

(76) Inventor: Michael L. Wach, Alpharetta, GA (US)

(\*) Notice: Subject to any disclaimer, the term of this patent is extended or adjusted under 35 U.S.C. 154(b) by 1015 days.

(21) Appl. No.: 12/583,149

(22) Filed: Aug. 14, 2009

Related U.S. Application Data

(60) Provisional application No. 61/188,931, filed on Aug. 14, 2008.

(51) Int. Cl.
*H04B 10/06* (2006.01)

(52) U.S. Cl.
USPC ............... 398/202; 398/208; 398/209

(58) Field of Classification Search
USPC ................. 398/202, 208, 209, 213
See application file for complete search history.

(56) References Cited

U.S. PATENT DOCUMENTS

| | | | |
|---|---|---|---|
| 6,028,462 A | 2/2000 | Kyles | |
| 6,545,567 B1 | 4/2003 | Pavan et al. | |
| 6,968,132 B1 * | 11/2005 | Thomas | 398/53 |
| 7,158,567 B2 | 1/2007 | Wang et al. | |
| 7,991,301 B2 * | 8/2011 | Mizuguchi et al. | 398/208 |
| 2004/0247320 A1 * | 12/2004 | Bickham et al. | 398/71 |
| 2004/0258423 A1 * | 12/2004 | Winzer | 398/202 |
| 2008/0019435 A1 | 1/2008 | Chou | |

OTHER PUBLICATIONS

Analui, Behnam, "Signal Integrity Issues in High-Speed Wireline Links: Analysis and Integrated System Solutions," Thesis for Degree of Doctor of Philosophy, California Institute of Technology, Pasadena, California, Jul. 25, 2005, 194 pages.

\* cited by examiner

*Primary Examiner* — M. R. Sedighian
(74) *Attorney, Agent, or Firm* — Hope Baldauff, LLC

(57) ABSTRACT

A stream of wavelength division multiplexed optical signals can be converted into the electrical domain and processed electrically to discriminate the information on each optical signal. An optical medium can transmit multiple optical communication signals, each having a different wavelength and each imprinted with different information. Detectors can receive the optical communication signals, with each detector receiving some of each communication signal. Thus, any one of the detectors can output an electrical signal according to a composite of multiple optical communication signals. Accordingly, each output electrical signal can include features or energy of each of the optical communication signals. An electrical circuit can process the electrical signals output by the detectors. The processing can remove from each electrical signal contributions from all but one of the optical communication signals, so that each processed electrical signal carries the information of a single wavelength division multiplexed optical signal.

11 Claims, 14 Drawing Sheets

OS1 101 incoming on waveguide 125 at wavelength $\lambda_1$, depicted in arbitrary units of optical intensity

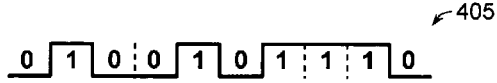

*Fig. 4A*

OS2 102 incoming on waveguide 125 at wavelength $\lambda_2$, depicted in arbitrary units of optical intensity

*Fig. 4B*

OS1 and OS2 as combined on waveguide 125

*Fig. 4C*

Optical signal emitted by optical circuit 250 onto waveguide 201 and incident on detector 211
In this example, 0.6 x OS1 + 0.4 x OS2

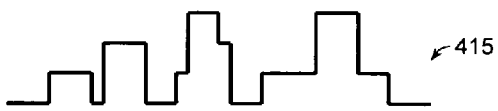

Optical signal emitted by optical circuit 250 onto waveguide 202 and incident on detector 212
In this example, 0.4 x OS1 + 0.6 x OS2

231 E(0.6 × OS1 + 0.4 × OS2)
Electrical signal output from detector 211
in arbitrary electrical units, illustrated in
one-to-one correspondence with optical units

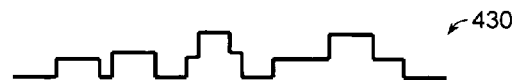

*Fig. 4F*

232 E'(0.4 × OS1 + 0.6 × OS2)
Electrical signal output from detector 212
in arbitrary electrical units, illustrated in
one-to-one correspondence with optical units

*Fig. 4G*

Signal 331
a = 3
Signal 331 = 3 × signal 231

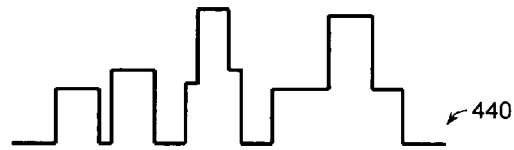

*Fig. 4H*

Signal 332
b = 2
Signal 332 = 2 × signal 232

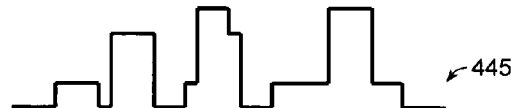

*Fig. 4I*

Signals 331 and 332 overlaid
with difference shaded

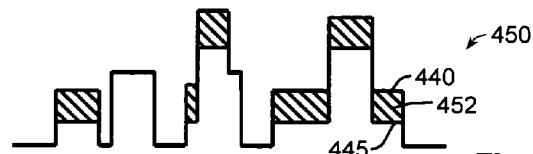

*Fig. 4J*

Signal EOS1 111
(difference between signals 331 and 332)

Signal OS1 101 per Fig. 4A
(shown for comparison)

*Fig. 4K*

Signal 333
c = 2
Signal 333 = 2 x signal 231

Signal 334
d = 3
Signal 334 = 3 x signal 232

Signals 333 and 334 overlaid
with difference shaded

Signal EOS2 112
(difference between signals 333 and 334)

Signal OS2 102 per Fig. 4B
(shown for comparison)

SYSTEM AND METHOD FOR RECEIVING OPTICAL SIGNALS

CROSS REFERENCE TO RELATED APPLICATIONS

This application claims priority to U.S. Provisional Patent Application No. 61/188,931 filed Aug. 14, 2008 in the name of Wach and entitled "System and Method for Receiving Optical Signals," the entire contents of which are hereby incorporated herein by reference.

FIELD OF THE TECHNOLOGY

The present technology generally relates to receiving optical communication signals and more specifically to discriminating wavelength division multiplexing ("WDM") optical signals from one another via electrical signal processing. Multiple optical signals, each of a different wavelength and each carrying distinct data, can be incident upon a detector. Processing the detector's electrical output can identify the data of an individual one of the WDM optical signals.

BACKGROUND

Optical communication involves imprinting or encoding information on light, thereby adapting the light to carry or convey the information as the light propagates or travels between two sites. The two sites may be across the globe or across a country, a state, a town, or a room, for example.

Imprinting or encoding information on light typically involves varying, modulating, or changing some attribute or aspect of the light over time to create a pattern representing the information. A sender or transmitter of the information imposes the pattern on the light, and a receiver of the information identifies the pattern and thereby receives the information.

For example, sailors on two distant ships may communicate with one another with powerful flashlights. One sailor pulses light on and off in a sequential pattern that represents letters of the alphabet, forming words and sentences, for example in Morse code. The other, distant sailor watches the light and notes the on-off pattern. Knowing the on-off sequences of each letter, that distant observer sailor determines the letters, words, and sentences via reversing the code. While modern fiber optic communication systems are more sophisticated than sailors sending messages to one another with flashlights, the basic concept is generally analogous.

A fiber optic communication system may comprise terminals or users linked together via optical paths, for example in a fiber optic network. Each terminal may comprise a transmitter and a receiver that may be components of a transceiver. Alternatively, a terminal may comprise a receiver without a transmitter. Each transmitter typically outputs light imprinted or encoded with information destined for receipt at a remote terminal. Meanwhile, each receiver typically receives light that has been imprinted or encoded with information at another, remote terminal. Accordingly, devices on an optical network can communication with one another via sending and receiving optical signals.

In certain conventional approaches known as WDM, course WDM ("CWDM"), and dense WDM ("DWDM"), a single optical path (often an optical fiber provides the transmission medium) concurrently conducts multiple optical signals, each carrying different information in a different wavelength band. Each wavelength or color provides an information channel. As a result, the optical path has an aggregate bandwidth or information carrying capability that is a multiple of the individual WDM, CWDM, or DWDM channel's bandwidth or information carrying capability.

Conventionally, a system of one or more optical filters manipulates the incoming light according to color. The filtering system diverts each of the WDM, CWDM, or DWDM channels to a dedicated detector. Thus, one detector exclusively receives one optical signal in an assigned wavelength band, while another detector exclusively receives another optical signal in another assigned wavelength band. Each channel has one assigned detector, and each detector has one assigned channel. The filtering system generally prevents a single detector from receiving two or more WDM, CWDM, or DWDM signals concurrently. With conventional technology, any incoming photons of one WDM, CWDM, or DWDM signal that might be received as stray light by a detector assigned to a different WDM, CWDM, or DWDM signal are generally inadvertent, unwanted, and detrimental. Accordingly, signal separation occurs in the optical domain.

An issue with the conventional receiver technology described above concerns optical filtering. Many conventional optical filtering systems, whether based on thin-film interference, arrayed waveguide gratings, or fiber Bragg grating technologies, are more expensive than applications with tight cost constraints can tolerate. Often, a significant portion of the expense is associated with meeting optical performance specifications requiring strict separation of WDM, CWDM, or DWDM optical signals. In other words, manufacturers typically go to great lengths to make filtering systems that prevent all but the smallest level of light of one wavelength from spilling into a detector assigned to another wavelength.

In view of the aforementioned representative deficiencies in the art (or some other related shortcoming), need exists for an improved optical communication system that can separate optical signals of differing wavelengths via electrical signal processing. Another need exists for a technology that can relax filtering specifications and/or that can utilize filtering devices that fail to meet tight filtering performance specifications. Further need exists for a WDM, CWDM, or DWDM receiver comprising multiple detectors that are each assigned to receiving multiple optical signals of different wavelengths. A technology addressing one or more such needs would benefit optical communications, for example via providing lower cost, better access to higher bandwidth, new applications, reduced size, lower power consumption, higher levels of integration, better manufacturability, etc.

SUMMARY

The present invention can support transmitting, transferring, or communicating information over light, with electrical processing discriminating optical signals from one another. The optical signals can carry digital or analog information via light propagation. Such optically encoded information can transmit around the globe; across a country, a state, a town, a neighborhood, or a room; among core processors of a multi-core microprocessor system; or between devices in an enclosure or a rack, on a backplane, within a computer or router chassis, on a circuit board, or in/on a single substrate, to mention a few examples. The information might be television content, Internet communications, intranet communications, e-mails, voice, music, broadcast entertainment, video images, digital pictures, clock pulses or control bits traveling over a bus connecting two or more processing cores, job data transferring among multiple computing elements within a single computer system, etc.

In one aspect of the present invention, multiple optical signals can each convey distinct or different information with each optical signal having a different wavelength (or in a different wavelength range). Thus, each optical signal can be imprinted or encoded with different analog or digital information. Multiple detectors can receive the optical signals. Each of the detectors can receive a portion of each of the optical signals and output an electrical signal based on a composite of the incident optical signals. Thus, an electrical signal output from a single detector can comprise signal features and/or energy of multiple optical signals. Processing the electrical signals can identify or reveal the information of each optical signal.

The discussion of receiving optical signals presented in this summary is for illustrative purposes only. Various aspects of the present invention may be more clearly understood and appreciated from a review of the following detailed description of the disclosed embodiments and by reference to the drawings and the claims that follow. Moreover, other aspects, systems, methods, features, advantages, and objects of the present invention will become apparent to one with skill in the art upon examination of the following drawings and detailed description. It is intended that all such aspects, systems, methods, features, advantages, and objects are to be included within this description, are to be within the scope of the present invention, and are to be protected by the accompanying claims.

Figure 1:
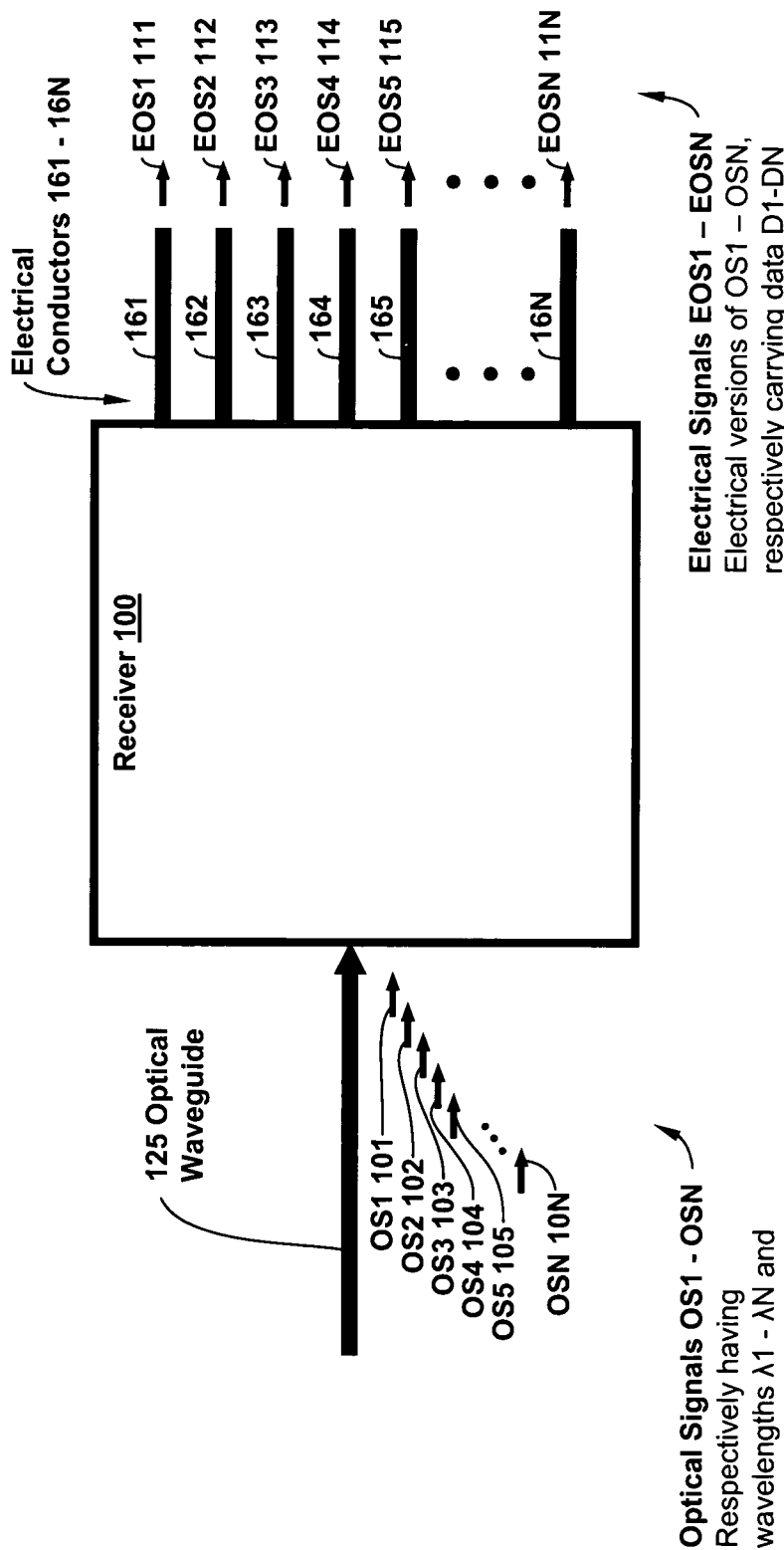
FIG. 1 is a high-level block diagram of a receiver that receives multiple optical signals, each carrying information over an optical waveguide at a unique wavelength, and emits multiple electrical signals, each carrying the information of one of the optical signals in accordance with certain exemplary embodiments of the present invention.

Many aspects of the present invention can be better understood with reference to the above drawings. The elements and features shown in the drawings are not necessarily to scale, emphasis instead being placed upon clearly illustrating principles of exemplary embodiments of the present invention. Moreover, certain dimensions may be exaggerated to help visually convey such principles. In the drawings, reference numerals designate like or corresponding, but not necessarily identical, elements throughout the several views.

DETAILED DESCRIPTION OF EXEMPLARY EMBODIMENTS

An exemplary embodiment of the present invention supports concurrently receiving multiple streams of optically encoded information, each at a different wavelength, and distinguishing each stream via signal processing substantially implemented in the electrical domain, thereby supporting WDM, CWDM, and DWDM with relatively simple optics.

The term "wavelength division multiplexing" or "WDM," as used herein, generally refers to transmitting, propagating, or conducting multiple optical signals, each conveying different or distinct information, on a common medium or along a common path, wherein each optical signal has a different wavelength or color or is assigned to a different region of the light spectrum. WDM often involves multiplexing multiple optical carrier signals on a single optical waveguide or fiber with different wavelengths or colors of light carrying different signals. The herein usage of the term "wavelength division multiplexing" or "WDM" is believed to be consistent with typical industry terminology.

The term "course wavelength division multiplexing" or "CWDM," as used herein, generally refers to a type of WDM wherein one optical medium or path carries about four or more WDM signals that are spaced at least about 10 nm from one another. For example, a first CWDM channel could be assigned the spectral range 1310-1320 nm, a second CWDM channel could be assigned the spectral range 1320-1330 nm, a third CWDM channel could be assigned the spectral range 1330-1340 nm, and so forth.

The term "dense wavelength division multiplexing" or "DWDM," as used herein, generally refers to a type of WDM wherein WDM wavelengths are positioned on a grid having a spacing of about 200 Giga-Hertz (GHz) or less (about 1.6 nm). Thus, each DWDM signal can be assigned to a wavelength channel having a width of about 200 GHz (about 1.6 nm) or less. Many DWDM schemes (though not necessarily all) conform to the "ITU" specifications published by the International Telecommunication Union. For example, a first DWDM signal may be assigned the optical spectrum of 1528.77-1529.16 nm, a second DWDM signal may be assigned the optical spectrum of 1529.55-1529.94 nm, a third DWDM signal may be assigned the optical spectrum of 1530.33-1530.72 nm, and so forth.

The present invention will be described more fully hereinafter with reference to FIGS. 1-10, which depict representative or illustrative embodiments thereof.

Figure 8:
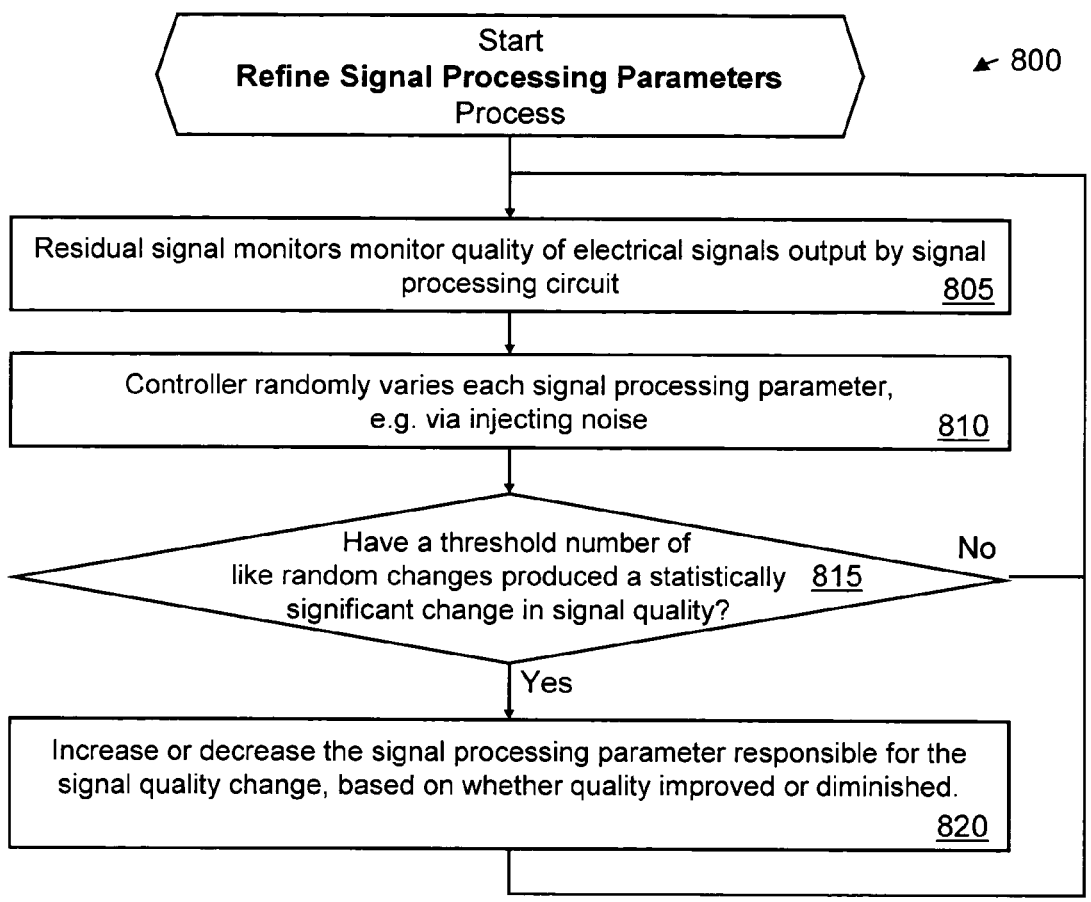
FIG. 8 is a flowchart of a process for refining signal processing parameters in support of distinguishing optical signals from one another via signal processing substantially conducted in the electrical domain in accordance with certain exemplary embodiments of the present invention.
Figure 9:
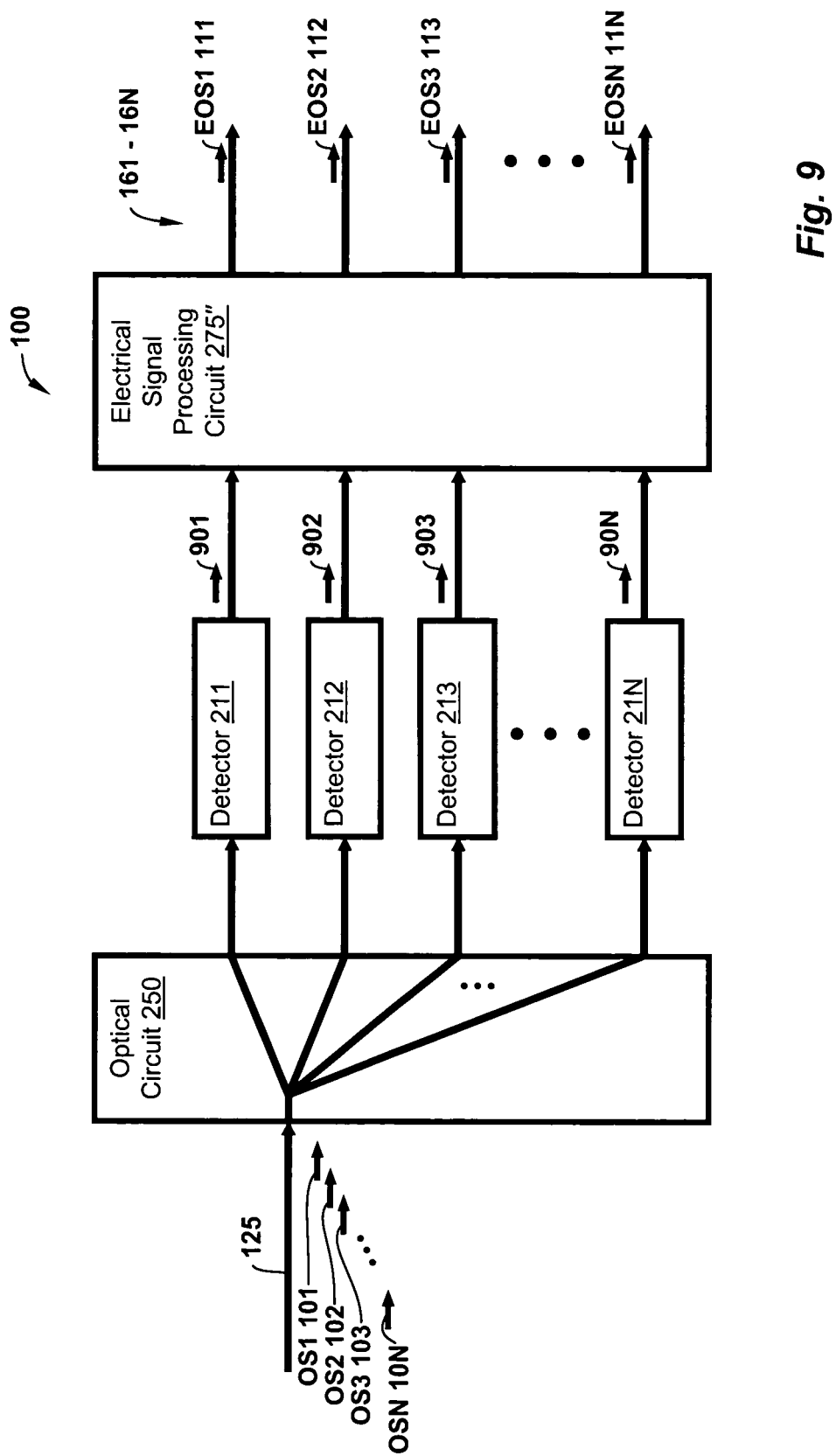
FIG. 9 is a functional block diagram of a receiver that receives multiple optical signals carrying information at different wavelengths and that emits multiple electrical signals, each carrying the information of one of the optical signals in accordance with certain exemplary embodiments of the present invention.
Figure 10:
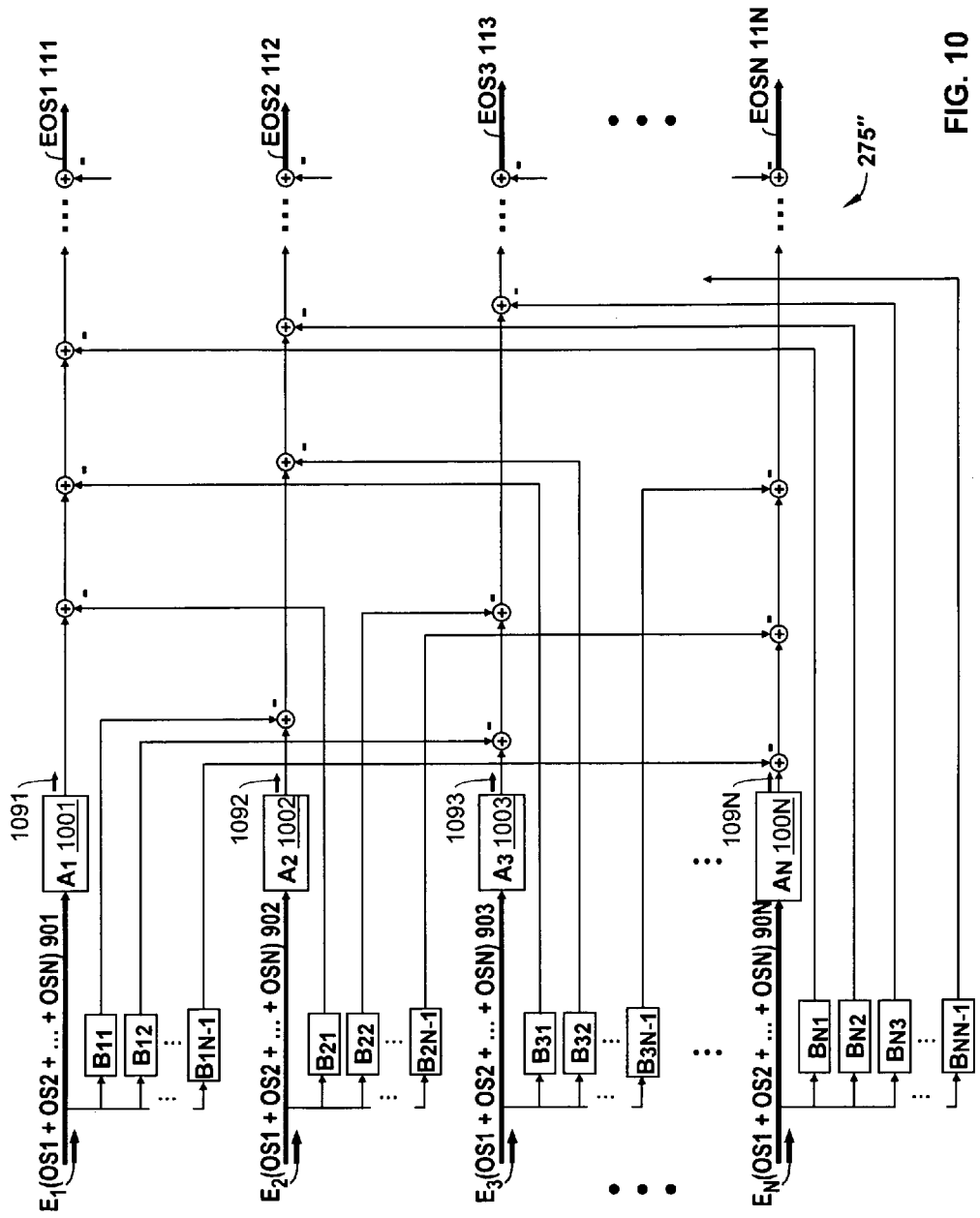
FIG. 10 is a functional block diagram for an electrical signal processing circuit of a receiver, wherein the circuit processes multiple electrical signals, each encoded with multiple distinct patterns of information, to produce multiple other electrical signals, each encoded with exactly one of the distinct patterns of information in accordance with certain exemplary embodiments of the present invention.

FIGS. 1, 9, and 10 illustrate representative diagrams for a receiver handling an arbitrary number of multiplexed optical signals. FIGS. 2A, 3, 4, and 5 illustrate representative diagrams, waveforms, and flowcharts for a receiver that receives two multiplexed optical signals and outputs two corresponding electrical signals. FIG. 2B illustrates a system that receives multiple optical signals and outputs multiple electrical signals for subsequent electrical signal processing. FIGS. 6, 7A, 7B, 7C, and 8 illustrate representative diagrams and a representative flowchart for receivers that refine signal processing parameters.

The present invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting, and among others supported by representations of the present invention.

Turning now to FIG. 1, this figure illustrates a high-level block diagram of an exemplary receiver 100 that receives multiple optical signals OS1 101, OS2 102, . . . , OSN 10N, each carrying information over an optical waveguide 125 at a unique wavelength, and emits multiple electrical signals EOS1 111, EOS2 112, . . . , EOSN 11N, each carrying the information of one of the optical signals OS1 101, OS2 102, . . . , OSN 10N according to certain embodiments of the present invention.

Each of the optical signals OS1 101, OS2 102, OS3 103, OS4 104, OS5 105, . . . , OSN 10N is aligned to a different wavelength, for example at a wavelength coordinate of a DWDM grid, or is otherwise in a different wavelength region. Thus, each of the optical signals OS1 101, OS2 102, . . . , OSN 10N can have a different color or can be in a different region of the light spectrum (often but not necessarily outside the range of human visual perception). According to the illustrated notation, the optical signals OS1 101, OS2 102, . . . , OSN 10N are respectively aligned to the wavelengths λ1-λN (lambda 1 to lambda N). That is, the optical signal OS1 101 has a wavelength λ1, the optical signal OS2 102 has a wavelength λ2, and so forth.

In other words, the optical signal OS1 101 has a wavelength or color that is distinct from that of the optical signal OS2 102. The wavelength λ1 can be aligned to one coordinate of a DWDM grid, while the wavelength λ2 can be aligned to a different coordinate of the DWDM grid. In certain exemplary embodiments, the two wavelengths can be CWDM wavelengths or WDM wavelengths.

In an exemplary embodiment, the wavelength λ1 can be at about 1310 nanometers ("nm"), while the wavelength λ2 is about 1550 nm. In another exemplary embodiment, the two wavelengths are both in a window of transmission around 1550 nm. In another exemplary embodiment, the two wavelengths are both in a window of transmission around 1310 nm. In yet another exemplary embodiment, the two wavelengths are both between about 600 and 1100 nm. The two wavelengths can be less than one nm apart, a few nm apart, tens of nm apart, or a hundred or more nm apart.

Each optical signal OS1 101, OS2 102, . . . , OSN 10N is typically encoded or imprinted with different or distinct information that may be in an analog or a digital format. Having different or distinct information does not imply that the optical signals OS1 101, OS2 102, . . . , OSN 10N do not carry some common information. In many instances, the optical signals OS1 101, OS2 102, . . . , OSN 10N will convey some overlapping or common information, such as control bits, framing information, protocol data, redundant data, etc. In the illustrated notation, the optical signals OS1 101, OS2 102, . . . , OSN 10N respectively carry data D1-DN. That is, the optical signal OS1 101 conveys data D1, the optical signal OS2 102 conveys data D2, and so forth.

In certain exemplary embodiments, the receiver 100 can support a data rate of at least 10 gigabits per second (Gbs). In various embodiments, the data rate can be about 1.25 Gbs, 5 Gbs, 10, Gbs, 12.5 Gbs, 20 Gbs, 30 Gbs, 40 Gbs, 50 Gbs, 60 Gbs, 100 Gbs, 150 Gbs, or 200 Gbs, or in a range between any two of these data rates.

As will be discussed in further detail below, the receiver 100 processes the incoming optical signals OS1 101, OS2 102, . . . , OSN 10N and outputs corresponding electrical signals EOS1 111, EOS2 112, . . . , EOSN 11N, respectively propagating on electrical conductors 161-16N. Each electrical signal EOS1 111, EOS2 112, . . . , EOSN 11N carries the information of one of the optical signals OS1 101, OS2 102, . . . , OSN 10N. Thus, the electrical signal EOS1 111 is imprinted or encoded with the information of optical signal OS1 101, specifically the data D1, and transmits over the electrical conductor 161; the electrical signal EOS2 112 is imprinted or encoded with the information of optical signal OS2 102, specifically the data D2, and transmits over the electrical conductor 162; and so forth.

The optical waveguide 125 transmits the optical signals OS1 101, OS2 102, . . . , OSN 10N from a source, such as a transmitter or another device (not illustrated), to the receiver 100. Accordingly, the receiver 100 is a recipient of information encoded on the optical signals OS1 101, OS2 102, . . . , OSN 10N via digital or analog modulation.

The term "optical waveguide" or "waveguide," as used herein, generally refers to a device or structure that directs, controls, or steers light to flow along a path, course, route, or channel and confines, limits, or binds the light so the light generally says on or in the path, course, route, or channel. An optical waveguide can comprise one or more structures that guide and/or generally confine light during transmission. For example, such an optical waveguide can comprise an elongate or elongated section of optical material that has high refractive index relative to an adjacent material, such as a cladding. In this configuration, the cladding helps keep the light on course. Another type of waveguide can comprise a material with a pattern of structures, such as holes, that help transmitting light maintain a prescribed course of travel without unwanted or excessive divergence or loss. Such a waveguide embodiment can be a "holey fiber" or a "photonic crystal fiber," for example.

The optical waveguide 125 facilitates two or more sites, nodes, or terminals sending and receiving information, either directly between one another or in communication with some other site or sites on an optical network. The optical waveguide 125 and the associated receiver 100 can be part of such an optical network, for example a wide area network ("WAN") that may span across a country, a state, or a significant geographic region. Alternatively, the optical waveguide 125 can connect nodes or sites within a local area network ("LAN"), a home network, a fiber-to-the-home ("FTTH") network, an access network, or one or more communication links within a local area (not an exhaustive list). In some applications, the optical waveguide 125 can be essentially contained within a single piece of equipment or in a single enclosure. In some exemplary embodiments, the optical waveguide 125 is disposed on or is attached to a single substrate, for example to connect processing cores of a multi-core microprocessor system (or other elements of a computing processor). The optical waveguide 125 can comprise (or be comprised by) a "short range optical interconnect" or an "ultra short range optical interconnect." Further, in some exemplary embodiments, the optical waveguide 125 can comprise a unitary optical path that links two users together, without supporting additional user connections. As one more example out of many possibilities, the optical waveguide 125 might provide one or more optical interconnects or optical links for a backplane or an optical bus that transmits information within communications or computing equipment. According, the receiver 100 can serve or be a component of a wide variety of communication devices or systems.

The receiver 100 can support receiving third-party messages, downloading Internet website content, watching television via the Internet, conducting voice-over-Internet-protocol ("VoIP") telephone conversations, downloading or accessing videos or songs, handling wireless backhaul content, etc. Thus, the receiver 100 can accommodate computing, voice communications, message exchanges, entertainment, or some other appropriate application or usage supported by optical communications.

Various embodiments of the receiver 100 can support a wide range of applications and operating environments, such as optical networking systems, optical communication applications, and computing devices. Such systems and applications can include WANs, LANs, metropolitan area networks ("MANs"), FTTH networks, fiber-to-the-curb ("FTTC") networks, fiber-to-the-whatever ("FTTX") networks, fiber-to-the-premises ("FTTP") networks, access networks, intra-cabinet communications, backplane communications, intra-computer communications, inter-computer communications, intra-core communications, buses for digital signal processors ("DSPs"), buses for systems on a chip ("SOCs"), chip-to-chip optical interconnects, core-to-core optical interconnects, optical links between or among features on a single chip, optical lines in multi-chip modules ("MCMs") and microprocessor buses, to mention a few examples. The elements depicted in FIG. 1 can be part of a larger network that may span across a country, a state, or a significant geographic region. Moreover, these elements can be part of a LAN, a home network, an FTTH network, an access network, one or more communication links within a local area, etc.

Embodiments of the receiver 100 can be essentially or substantially contained within a single piece of equipment, in a single enclosure, or in a singe package such as a dual inline pin ("DIP") package. In various exemplary embodiments, the receiver 100 can have a geometric form of a butterfly-type package, DIP package, a "XENPAK" package, an "XPAK" package, an "X2" package, a "small form-factor pluggable" ("SFP") package, an "XFP" package, a die, a TO-56 header package, an industry-standard package, a MCM package, a package conforming to a multi-source agreement ("MSA"), etc. Thus in certain exemplary embodiments, the receiver 100 comprises multiple components, elements, or material systems in a common enclosure.

The receiver 100 can comprise various discrete electrical, digital, logic, electronic, optical, and optoelectronic components. In certain exemplary embodiments, the receiver's optical, optoelectronic, and electrical circuitry elements discussed below are provided in a common material system such as lithium niobate, indium phosphide, or silicon. Furthermore, those optical, optoelectronic, and electrical circuitry elements can be grown on a common substrate. In one exemplary embodiment, the receiver 100 comprises a planar light-guide circuit, also known as a planar lightwave circuit, (in either case, a "PLC") or a photonic integrated circuit ("PIC"). Thus, a PLC or a PIC can provide a platform for the receiver's optical, optoelectronic, and electrical circuitry elements, which are discussed below.

In certain exemplary embodiments, the components of the receiver 100 that are discussed below (including but not limited to the pertinent illustrated elements of FIGS. 1-10 having associated reference numbers) can be mounted on a substrate, such as a plate, block, sheet, wafer, or slab of material, with a composition of glass, silica, sapphire, aluminum oxide, ceramic, or silicon, for example. In certain embodiments, the substrate is an optical bench, such as a silicon optical bench ("SiOB"). In certain exemplary embodiments, the receiver's components are integrated in or grown on a semiconductor material, such as a silicon-based material, InGaAs, germanium, InP, III-V material, III-V semiconductor material, etc. Those components can be either monolithically integrated or hybrid integrated, for example. Moreover, they can be grown on, embedded in, or bonded to a common substrate. Further the receiver 100 can have as its foundation a singe substrate comprising (or consisting of) silicon with attached optical waveguides, for example in a "silicon-on-insulator" format or as a monolithic platform. Accordingly, the receiver's optical, optoelectronic, and/or electronic components can be a unitary structure, a monolithic system or "chip," or a collection of elements fastened or bonded together. Further, the receiver 100 can be implemented on a silicon, lithium niobate, or indium phosphide substrate, either as a monolithic or hybrid device.

FIGS. 2A, 2B, 3, 4, 5A, and 5B will now be discussed in the context of describing exemplary embodiments of the receiver 100 in further detail.

Figure 2A:
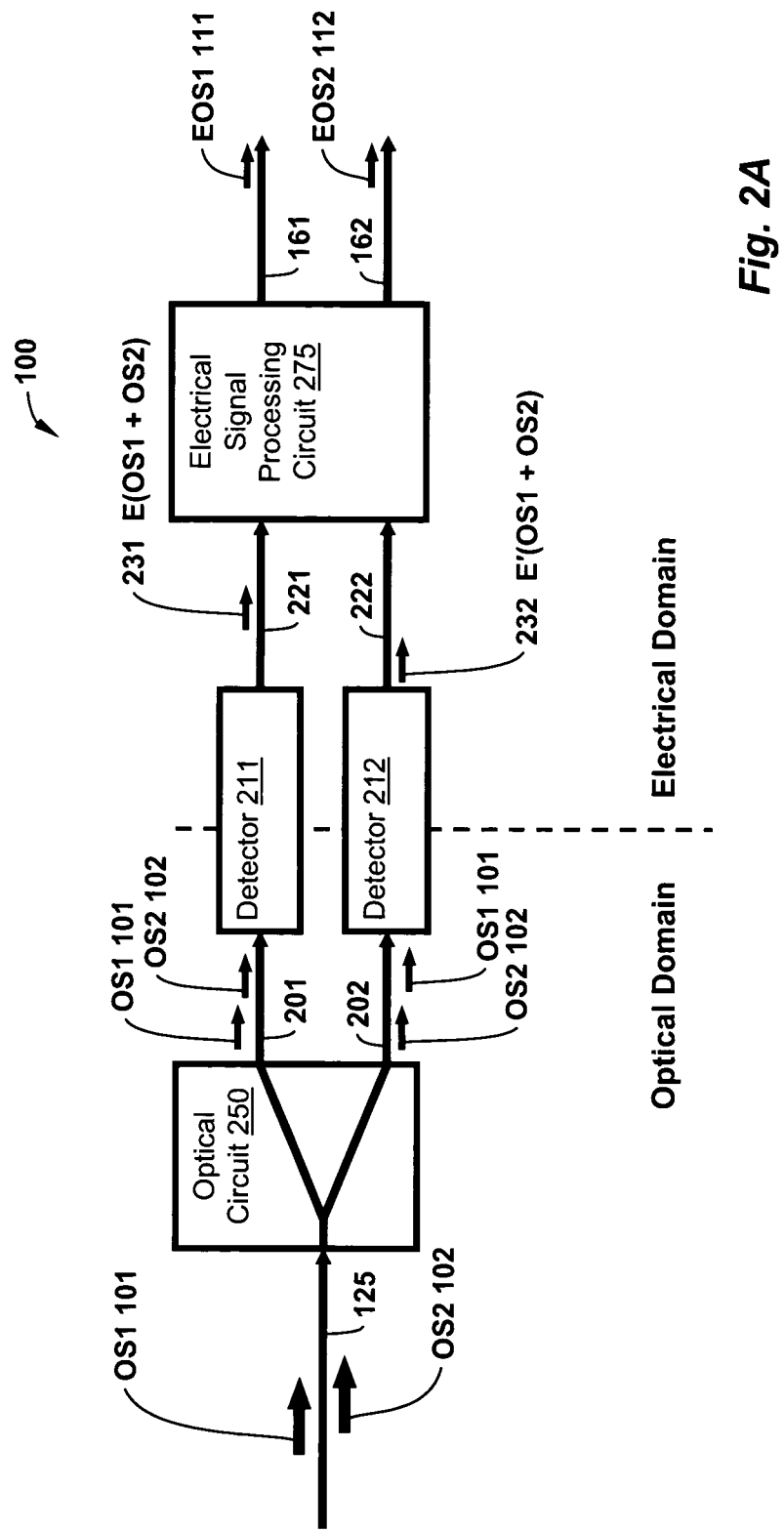
FIG. 2A is a functional block diagram of a receiver that receives two optical signals carrying information at different wavelengths and that emits two electrical signals, each carrying the information of one of the optical signals in accordance with certain exemplary embodiments of the present invention.
Figure 2B:
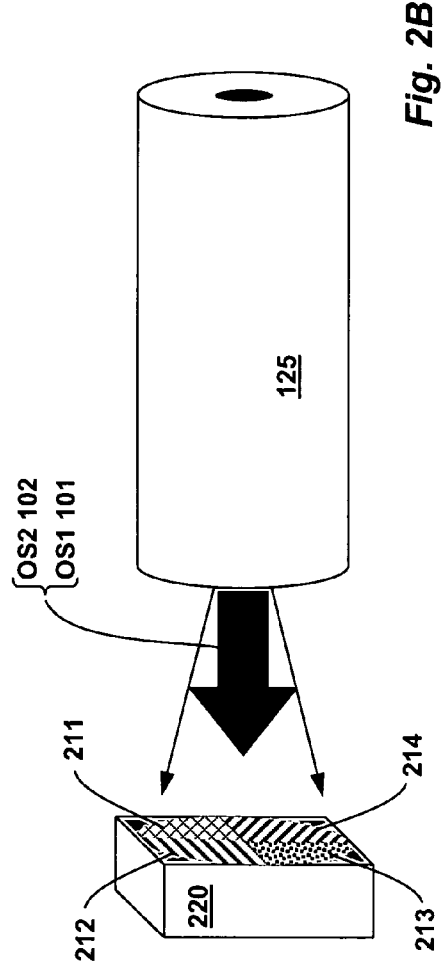
FIG. 2B is an illustration of a system that receives four optical signals, each carrying information at a different wavelength, and emits four electrical signals, each comprising energy or signal features of all four optical signals in accordance with certain exemplary embodiments of the present invention.
Figure 3:
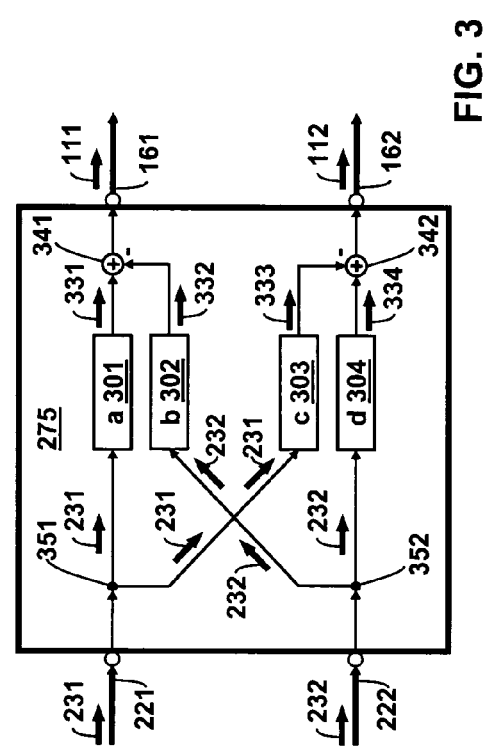
FIG. 3 is functional block diagram for an electrical signal processing circuit of a receiver, wherein the circuit processes two electrical signals, each encoded with two distinct patterns of information, to produce two other electrical signals, each encoded with exactly one of the two distinct patterns of information in accordance with certain exemplary embodiments of the present invention.

FIG. 2A illustrates a functional block diagram of an exemplary receiver 100 that receives two optical signals OS1 101, OS2 102 carrying information at different wavelengths and that emits two electrical signals EOS1 111, EOS2 112, each carrying the information of one of the optical signals OS1 101, OS2 102 according to certain embodiments of the present invention. FIG. 3 illustrates a functional block diagram for an exemplary electrical signal processing circuit 275 of the receiver 100, wherein the circuit 275 processes two electrical signals 231, 232, each encoded with two distinct patterns of information, to produce two other electrical signals EOS1 111, EOS2 112, each encoded with exactly one of the two distinct patterns of information according to certain embodiments of the present invention. FIG. 4 illustrates similar waveforms 405, 410, 415, 420, 425, 430, 435, 440, 445, 450, 455, 460, 465, 470, 475 for exemplary signals flowing through the receiver 100 according to certain embodiments of the present invention.

Figure 5A:
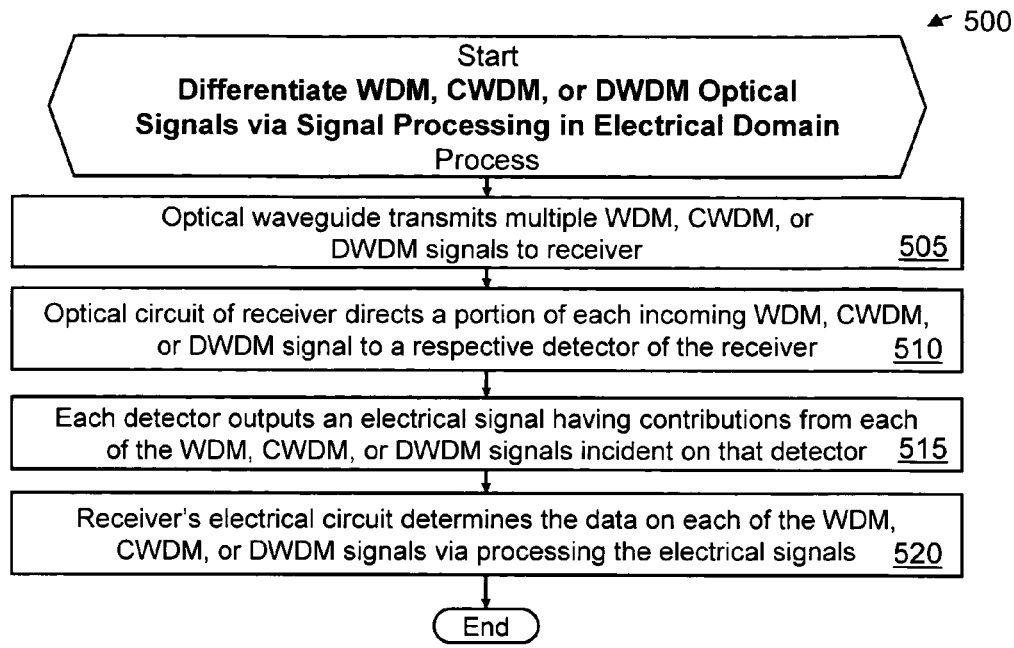
FIG. 5A is a flowchart of a process for distinguishing optical signals from one another via signal processing substantially conducted in the electrical domain in accordance with certain exemplary embodiments of the present invention.
Figure 5B:
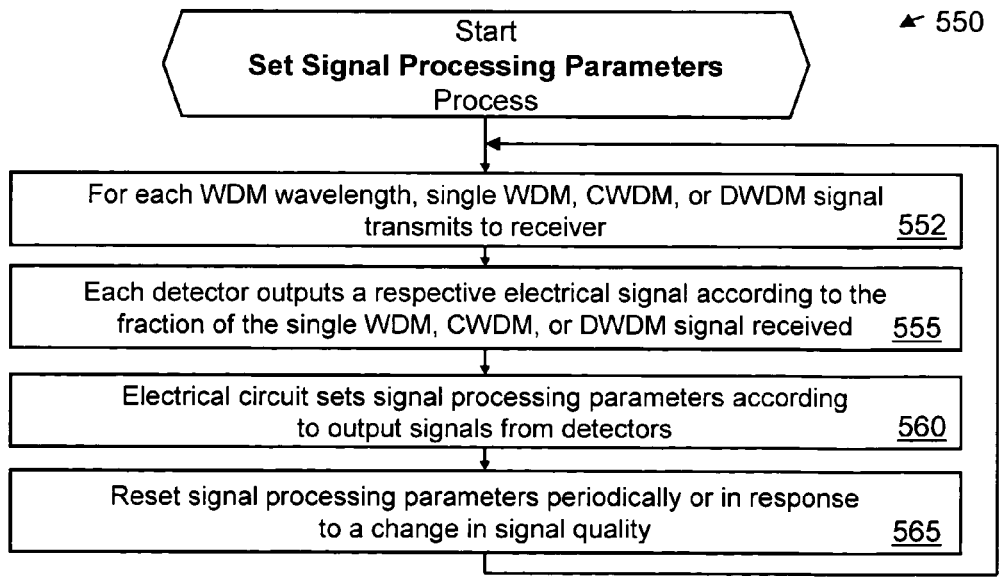
FIG. 5B is a flowchart of a process for defining signal processing parameters in support of distinguishing optical signals from one another via signal processing substantially conducted in the electrical domain in accordance with certain exemplary embodiments of the present invention.

FIG. 5A illustrates a flowchart of an exemplary process 500 for distinguishing optical signals OS1 101, OS2 102, ..., OSN 10N from one another via signal processing substantially conducted in the electrical domain according to certain embodiments of the present invention. FIG. 5B illustrates a flowchart of an exemplary process 550 for defining signal processing parameters in support of distinguishing optical signals OS1 101, OS2 102, ..., OSN 10N from one another via signal processing substantially conducted in the electrical domain according to certain embodiments of the present invention.

Process 500, as illustrated in FIG. 5A, is entitled "Differentiate WDM, CWDM, or DWDM Optical Signals via Signal Processing in Electrical Domain." Certain steps in process 500, as well as in other methods and processes disclosed herein, naturally precede others for the technology to function as described. However, the present invention is not limited to the order of the steps described if such order or sequence does not adversely alter the functionality of the present invention. That is, it is recognized that some steps may be performed before or after other steps or in parallel with other steps without departing from the scope and spirit of the present invention.

At step 505 of process 500, the optical waveguide 125 transmits multiple WDM, CWDM, or DWDM optical signals, which FIG. 2A illustrates as the exemplary optical signal OS1 101 and the exemplary optical signal OS2 102. FIGS. 4A and 4B respectively illustrate exemplary waveforms 405 and 410 for the two incoming optical signals OS1 101 and OS2 102.

The optical signal OS 1 101 is imprinted or encoded with information in the form of data D1 aligned with wavelength $\lambda 1$, which FIG. 4A illustrates as an exemplary pattern of ones and zeros arriving in sequence. In an exemplary embodiment, each one and zero is represented by a discrete (typically but not necessarily binary) intensity of light.

As shown in FIG. 4B, optical signal OS2 102 is imprinted or encoded with data D2 aligned with wavelength $\lambda 2$ in a pattern or sequence of ones and zeroes that is different than that of the optical signal OS1 101.

FIG. 4C illustrates the aggregate or composite waveform 415 propagating on the optical waveguide 125, resulting from OS1 101 and OS2 102. The waveform 415 illustrates exemplary intensity variations on the waveguide 125 from the combination of light of wavelength $\lambda 1$ and wavelength $\lambda 2$. Thus, the waveform 415 comprises a composite of two amplitude modulated optical signals, specifically the optical signals OS1 101 and OS2 102, each in a different region of the optical spectrum.

In this example, the signal on waveguide 125 can be described as:

OS1 101 at wavelength $\lambda_1$ and OS2 102 at wavelength $\lambda_2$.

As illustrated, the optical signals OS1 101 and OS2 102 are out of phase with respect to one another. They may also be in phase, in synchronization but out of phase, or out of synchronization. Typically, but not necessarily, the optical signals OS1 101 and OS2 102 have no particular polarization relationship with respect to one another. In certain exemplary embodiments, the optical signals OS1 101 and OS2 102 will have different data rates or modulation speeds. Moreover, the optical signals OS1 101 and OS2 102 need not have any special correlation or relationship with respect to one another other than having different wavelengths or some other difference that supports distinguishing them from one another. (As an alternative to having different wavelengths, the optical signals OS1 101 and OS2 102 can have different phases, intensities, polarizations, data rates, modulation styles, data types, or some other parameter, characteristic, or property that supports distinguishing them with respect to one another.)

At step 510, the optical circuit 250 of the receiver 100 directs a portion of each incoming WDM, CWDM, or DWDM signal (exemplarily illustrated in FIG. 2A as the optical signal OS1 101 and the optical signal OS2 102) to a respective detector (exemplarily illustrated in FIG. 2A as the detector 211 and the detector 212). As illustrated in FIG. 2A, the optical circuit 250 sends some of the optical signal OS1 101 to the detector 211 via the optical waveguide 201, some of the optical signal OS1 101 to the detector 212 via the optical waveguide 202, some of the optical signal OS2 102 to the detector 211 via the optical waveguide 201, and some of the optical signal OS2 102 to the detector 212 via the optical waveguide 202.

In certain exemplary embodiments, the optical signals OS1 101 and OS2 102 are metered or proportioned between the detectors 211 and 212. In various exemplary embodiments, the respective amounts of the optical signals OS1 101 and OS2 102 received by each of the detectors 211 and 212 can be characterized as specified, predetermined, predefined, purposeful, beneficial, or defined. Each of the detectors 211 and 212 can receive a composite optical signal that comprises features of or energy from or carries information from two or more wavelength specific optical signals. Each detector 211 can receive two optical signals blended in a predefined ratio but modulated according to a common modulation scheme. Moreover, each detector 211 and 212 can be assigned to receive multiple wavelength multiplexed channels.

In certain exemplary embodiments, the signal amounts can be set or defined in accordance with a predetermined light allocation scheme. The term "predetermined light allocation scheme," as used herein, generally refers to a plan or scheme for allocating light or optical signals between or among receivers, sensors, detectors, or other devices that convert light into corresponding electrical signals. Some deviation from the scheme can be associated with tolerances, random variations, noise, changes in operating conditions, etc.

The optical circuit 205 can comprise a PLC that splits the optical signals OS1 101 and OS2 102 while providing some wavelength preference or discrimination. For example, the optical circuit 205 can comprise a Y-branch wherein one or more Bragg gratings cause one output leg to carry a higher amount of the optical signal OS1 101, while the other output leg carries a higher amount of the optical signal OS2 102. In certain exemplary embodiments, the optical circuit 205 comprises a wavelength selective splitter.

In certain exemplary embodiments, the optical circuit 205 comprises an off-spec arrayed waveguide grating or similar device. For example, the optical circuit 205 can be a filtering device having channel isolation performance that is too low or performance tolerances that are too loose for conventional receivers. In other words, the optical circuit 205 can comprise one or more optical elements that separate light according to wavelength or color, wherein each of the separated light signals bleeds over to one another, either by design or by virtue of failing to meet a manufacturing specification or tolerance. As will be discussed in further detail below, processing electrical versions of the optical signals 101 OS1 and OS2 101 in the electrical domain facilitates utilizing filters that would otherwise be considered low-performance and/or compensating for filtering errors.

In certain exemplary embodiments, the optical circuit 250 comprises a fused waveguide coupler. In certain exemplary embodiments, the optical circuit 250 comprises one or more thin-film interference filters, for example operating in a cascade architecture. In certain exemplary embodiments, the optical circuit 250 is an edge filter disposed between two gradient index lenses, wherein transmitting light is directed to one of the waveguides 201 and 202 while reflected light is directed to the other one of the waveguides 201 and 202.

In various exemplary embodiment, the optical circuit 250 comprises a device, structure, system, or feature providing light transmission and/or light reflection that varies according to light frequency, wavelength, or color. Various embodiments can manipulate or manage light via diffraction, refraction, interference, thin-film interference, one or more interferometers, one or more gratings, absorption, scattering, amplification, holography, etc. Exemplary gratings can comprise fiber Bragg gratings, Bragg gratings, diffraction gratings, corrugated gratings, etched gratings, surface relief gratings, free space gratings, ruled gratings, volume gratings, holographic gratings, etc.

In certain exemplary embodiments, the optical circuit 250 can comprise one or more diffractive elements, holographic lenses, concave lenses, convex lenses, cylindrical lenses, Fresnel lens, PLC features, prisms, circulators, isolators, lens arrays, ball lenses, micro-optic components, nano-optic elements, planar micro-lenses, ion-exchanged components, gradient index optics, free-space optics, integrated optics, modern optics, interconnects, crystals, lenslets, or other suitable active or passive components for manipulating light. (This, like all other lists and examples presented herein, is not exhaustive and is not limiting.)

In certain exemplary embodiments, the optical circuit 250 comprises a filtering device or an optical filter. The term "filtering device," as used herein, generally refers to a device, system, or apparatus that transmits, reflects, diverts, directs, absorbs, meters, or deflects light and/or optical signals according to wavelength or color. The term "optical filter," as used herein, generally referrers to a device, structure, system, or feature for transmitting, absorbing, reflecting, controlling, and/or deflecting light in a manner that varies according to light wavelength, color, or frequency. Various embodiments of optical filters and filtering devices can manipulate or manage light via diffraction, refraction, interference, thin-film interference, surface plasmons, plasmonics, interferometers, gratings, absorption, scattering, amplification, resonance, holography, etc.

In certain exemplary embodiments, the optical circuit 250 is a splitter providing little or no wavelength selectivity. Thus, the optical circuit 250 can comprise an optic designed to divide light between the detectors 211 and 212 without any intended wavelength selectivity. In this situation, the detectors 211 and 212 typically have different sensitivities to the optical signals OS1 101 and OS2 102.

Accordingly, the optical circuit 250 can have a wide variety of embodiments and forms, representative but not exhaustive ones of which are described herein.

FIG. 4D illustrates an exemplary waveform 420 output by the optical circuit 250 onto the optical waveguide 201. In this example, the optical circuit 250 has directed 60 percent of the optical signal OS1 101 and 40 percent of the optical signal OS2 102 onto the optical waveguide 201 for receipt by the detector 211. As illustrated by the exemplary waveform 425 of FIG. 4E, the optical circuit 250 has directed 40 percent of the optical signal OS1 101 and 60 percent of the optical signal OS2 102 onto the optical waveguide 202 for receipt by the detector 212.

As discussed below with reference to process 550 (see FIG. 5B) these percentages can be determined via sending the optical signal OS1 101 to the receiver 100 with the optical signal OS2 102 off and then sending the optical signal OS2 102 to the receiver 100 with the optical signal OS1 102 off.

The aforementioned percentages are merely one example provided towards clearly describing operating principles of an exemplary embodiment of the present invention. The present invention can operate with a wide variety of light allocation schemes. Moreover, substantial amounts of light can be lost in the optical circuit 250, so the percentages of light allocated between the optical waveguides 201 and 202 do not necessarily add up to 100 percent, for example.

In the example of the aforementioned percentages, the optical signal output by optical circuit 250 onto the optical waveguide 201 for receipt by the detector 211 can be described as:

$$0.6(OS1\ 101)+0.4(OS2\ 102) \qquad \text{Equation A.}$$

And, the optical signal output by the optical circuit 250 onto the waveguide 202 for receipt by the detector 212 can be described as:

$$0.4(OS1\ 101)+0.6(OS2\ 102) \qquad \text{Equation B.}$$

At step 515, the detector 211 receives 60 percent of the optical signal OS1 101 and 40 percent of the optical signal OS2 102 and outputs an electrical signal 231 E(OS1+OS2) onto the line 221, typically an electrical conductor such as wire or a trace on a chip, substrate, or circuit board. FIG. 4F illustrates an exemplary waveform 430 for that electrical signal 231 output by the detector 211. Also at step 515, the detector 212 receives 40 percent of the optical signal OS1 101 and 60 percent of the optical signal OS2 102 and outputs an electrical signal 232 E'(OS1+OS2) onto the line 222, typically an electrical conductor as discussed above. FIG. 4G illustrates an exemplary waveform 435 for that electrical signal 232 output by the detector 212.

In response to receiving composites of the optical signals OS1 101 and OS2 102, the detectors 211 and 212 of the receiver 100 produce respective electrical signals 231 and 232. In other words, each of the electrical signals 231 E(OS1+OS2) and 232 E'(OS1+OS2) comprises signal features associated with the data D1 and signal features associated with the data D2.

Thus, the detector 211 of the receiver 100 concurrently receives the optical signal OS1 101 and the optical signal OS2 102 and outputs the waveform 430 as electrical energy, for example as voltage, current, and/or power. Accordingly, the detector 211 receives light in which the optical signals OS1 101 and OS2 102 are superimposed upon one another and converts that light into the corresponding electrical signal 231 E(OS1+OS2). The electrical signal 231 E(OS1+OS2) output by the detector 211 of the receiver 100 thus contains signal features (typically but not necessarily comprising amplitude features) representing an overlay of the data D1 and the data D2. In other words, the electrical signal 231 E(OS1+OS2) comprises features associated with the bits of the waveform 405 superimposed with features associated with the bits of the waveform 410. Moreover, the electrical signal 231 E(OS1+

OS2) can comprise energy from or of the optical signal OS1 101 and the optical signal OS2 102.

Similarly, the detector 212 concurrently receives the optical signal OS1 101 and the optical signal OS2 102 and outputs the waveform 435 as electrical energy, for example as voltage, current, and/or power. Accordingly, the detector 212 receives light in which the optical signals OS1 101 and OS2 102 are superimposed upon one another and converts that light into the corresponding electrical signal 232 E'(OS1+OS2). The electrical signal 232 E'(OS1+OS2) output by the detector 212 thus contains signal features (typically but not necessarily comprising amplitude features) representing an overlay of the data D1 and the data D2. In other words, the electrical signal 232 E'(OS1+OS2) comprises features associated with the bits of the waveform 405 superimposed with features associated with the bits of the waveform 410. Moreover, the electrical signal 232 E'(OS1+OS2) can comprise energy from or of the optical signal OS1 101 and the optical signal OS2 102.

In various exemplary embodiments, the detectors 211 and 212 can comprise avalanche photodiodes ("APDs"); pin photodiodes; charge coupled devices ("CCDs"); two respective light-receiving elements on a single CCD, transimpedance amplifiers; detection devices comprising silicon, indium phosphide, indium gallium arsenide, lithium niobate, gallium arsenide, etc.; technology for converting optical signals into electrical signals; or some other means for sensing, detecting, or receiving, light, for example.

Continuing with the example involving the above percentages, the electrical signal output by detector 211 onto line 221 for receipt by signal processing circuit 275 can be described as:

$$E(0.6(OS1\ 101)+0.4(OS2\ 102))$$

With linear detector response and arbitrary electrical and optical units that are like scaled, (or with the optical signal and the electrical signal both in units of power, whereby the detector 211 provides a sufficient power boost to achieve one-to-one conversion from optical power to electrical power), this equation can be restated as:

$$E(0.6(OS1\ 101)+0.4(OS2\ 102))=0.6(OS1\ 101)+0.4(OS2\ 102)$$

Similarly, the electrical signal output by detector 212 onto line 222 for receipt by the signal processing circuit 275 can be described as:

$$E'(0.4(OS1\ 101)+0.6(OS2\ 102))$$

And, this equation can be restated as:

$$E'(0.4(OS1\ 101)+0.6(OS2\ 102))=0.4(OS1\ 101)+0.6(OS2\ 102)$$

For the benefit of explaining principles of certain exemplary embodiments of the present invention, FIGS. 4F and 4G illustrate the waveforms 430 and 435, which are electrical, with heights drawn essential equal to the heights of the corresponding waveforms 420 and 425, which are optical, of FIGS. 4D and 4E. Those skilled in the art having benefit of this disclosure will appreciate that the graphical scale of FIGS. 4F and 4G can be different than the graphical scale of FIGS. 4D and 4E. For example, the optical scale can be in units of optical intensity while the electrical scale is in units of amps or volts.

Moreover, the optical scale and the electrical scale can both represent power, for example in milliwatts. In this situation, the waveform 430 is not necessarily equal in intensity to the waveform 420, and the waveform 435 is not necessarily equal in intensity to the waveform 435. Differences in power levels before and after conversion from the optical domain to the electrical domain can be due to: amplifiers associated with the detectors 211 and 212, for example trans-impedance amplifiers; loss of optical or electrical power; detector efficiency less than 100 percent, for example about 30-60 percent; non-linearity of the optical-to-electrical conversion; offset or bias applied in the optical or electrical domain; etc.

In certain exemplary embodiments, the detectors 211 and 212 respond differently to different wavelengths of light. In other words, when illuminated by the same intensity of light at the same wavelength, one of the detectors 211 and 212 can output a higher level of electricity than the other. For example, the detector 211 could be more sensitive to light at 1310 nm than at 1550 nm, with the detector 212 more sensitive to light at 1550 nm than at 1310. The detectors 211 and 212 can have different spectral sensitivities as a result of being made of different materials, for example. Alternatively, the detectors 211 and 212 can each be coated with a thin-film filter that rejects or diverts certain spectral windows. For example, the detector 211 can be coated with a thin-film interference filter having 90 percent transmission at 1310 nm and 85 percent transmission at 1550 nm, while the detector 212 could be coated with a filter having 95 percent transmission at 1310 nm and 90 percent transmission at 1550 nm. (With the percentages being merely exemplary rather than limiting.)

For example, turning briefly to the embodiment of FIG. 2B, the detectors 211 and 212 can be disposed or grown on a common substrate 220, with each detector 211 and 212 responding differently to incident light according to wavelength. The optical waveguide 125 (in this case a single-mode optical fiber) directly illuminates both detectors 211 and 212 with a combination of the optical signals OS1 101 and OS2 102, for example supplying light without any intermediate coupling optics or lenses. In certain exemplary embodiments, the detectors 211 and 212 have different surface areas, so a significantly different amount of light flux is incident on each. In the illustrated embodiment, the substrate 220 has two additional detectors 213 and 214 attached thereto, to facilitate receiving and discriminating additional optical signals. In certain exemplary embodiments, a CCD or other detector array can comprise the substrate and the associated detectors 211, 212, 213, 214, including a color-sensitive CCD providing three detectors. In practice, the electrical detector outputs can be coupled to a signal processing circuit, such as the signal processing circuit 275 or another embodiment discussed herein that accommodates three, four, or more electrical signals.

Turning now back from FIG. 2B, with a difference in wavelength sensitivity, the optical circuit 250 can split the optical signals OS1 101 and OS2 102 between the detectors 211 and 212 without a substantial level of wavelength selectivity. Thus, the optical circuit 250 can direct 50 percent of each of the optical signals OS1 101 and OS2 102 to each of the detectors 211 and 212. By way of another example, the optical circuit 250 could send 40 percent of the optical signal OS1 to the detector 211, 40 percent of the optical signal OS2 to the detector 211, 60 percent of the optical signal OS1 to the detector 211, and 60 percent of the optical signal OS2 to the detector 211, for example. (The aforementioned percentage are merely representative of certain exemplary embodiments of the present invention and are presented without limitation.)

Accordingly, the electrical signal 231 E(OS1+OS2) and the electrical signal 232 E'(OS1+OS2) can have different levels of signal representation from the optical signal OS1 101 and/or the optical signal OS2 102; and the difference can be due to spectral sensitivity of the optical circuit 250, spectral sensitivity of one or more of the detectors 211 and 212, and/or spectral sensitivity of some other optical, optoelectronic, or electrical device.

At step 520, the signal processing circuit 275 of the receiver 100 determines the data encoded on each of the incoming WDM, CWDM, or DWDM signals (exemplarily illustrated in FIG. 2A as the optical signal OS1 101 and the optical signal OS2 102) via processing the electrical signal 231 E(OS1+OS2) and the electrical signal 232 E'(OS1+OS2) respectively output from the detectors 211 and 212. In an exemplary embodiment, the signal processing circuit 275 essentially generates one electrical signal EOS1 111 dedicated to the optical signal OS1 101 and another electrical signal EOS2 112 dedicated to the optical signal OS2 102 via applying electrical signal processing that effectively solves a set of simultaneous equations.

FIG. 3 illustrates an exemplary embodiment of the signal processing circuit 275 in schematic or block diagram form. The signal processing circuit 275 includes taps 351, 352; multipliers 301, 302, 303, 304; and adders (or subtracters) 341, 342.

The tap 351 taps the electrical signal 231 E(OS1+OS2) for receipt by the multiplier 303. The tap 352 taps the electrical signal 232 E'(OS1+OS2) for receipt by the multiplier 302.

Each of the taps 351 and 352 typically comprises a provision for feeding, tapping, sampling, or otherwise acquiring a signal. Each tap 351, 352 can comprise a circuit node, an intersection of two circuit traces, or active circuitry for sampling a respective one of the electrical signals 231 E(OS1+OS2) and 232 E'(OS1+OS2). In an exemplary embodiment, the taps 351 and 352 have sufficient impedance or isolation (or alternatively lack of impedance if deployed in series) to avoid detrimentally loading the electrical signal 231 E(OS1+OS2) and 232 E'(OS1+OS2). In other words, the taps 351 and 352 sample the electrical signals 231 E(OS1+OS2) and 232 E'(OS1+OS2) without inducing significant signal degradation that might negatively impact operation of the signal processing circuit 275.

The multiplier 301 multiplies or scales the electrical signal 231 E(OS1+OS2) by the factor "a." The multiplier 302 multiplies or scales the electrical signal 232 E'(OS1+OS2), from the tap 352, by the factor "b." The multiplier 303 multiplies or scales the electrical signal 231 E(OS1+OS2), from the tap 351, by the factor "c." The multiplier 304 multiplies or scales the electrical signal 232 E'(OS1+OS2) by the factor "d." The factors "a," "b," "c," and "d" are representative (but not limiting) signal processing parameters for the signal processing circuit 275.

As will be appreciated by those of ordinary skill in the art having benefit of this disclosure, various embodiments of the multiplier 302, can comprise adjustable gain amplifiers, multiplying circuits, operational amplifiers, scaling circuit, integrated circuits, etc., as such devices are well known and readily available.

As will be discussed in further detail below with reference to FIG. 6, the multipliers 301, 302, 303, 304 can be adjustable. In one exemplary embodiment, each multiplier 301, 302, 303, 304 comprises an adjustable amplifier that comprises an inverting operational amplifier configuration with a variable resistor (for example a voltage-controlled resistor) or load in a feedback loop. The amplifier's gain can be controllable according to the variable resistor. Various other embodiments of adjustable amplifiers are available to one of ordinary skill in the art having benefit of the disclosure, via off-the-shelf-components, integrated circuit chips, various designs described in public technical and patent literature, etc.

The adder 341 adds a negative output of the multiplier 302 to the output of the multiplier 301. Thus, the adder 341 subtracts the output of the multiplier 302 (the signal 332) from the output of the multiplier 301 (the signal 331), or otherwise determines a differences between the signals 331 and 332.

As will be appreciated by those of ordinary skill in the art having benefit of this disclosure, various embodiments of the adder 314 and the adder 342 can comprise operational amplifiers, transistor circuits, differential amplifiers, inverting amplifiers, integrated circuits, etc., as such devices are well known and readily available.

The adder 342 adds a negative output of the multiplier 303 to the output of the multiplier 304. Thus, the adder 342 subtracts the output of the multiplier 303 (the signal 333) from the output of the multiplier 304 (the signal 304), or otherwise determines a differences between the signals 333 and 334.

The signal processing parameters "a," "b," "c," and "d" can be set according to mathematical relationships or rules governing operations of the signal processing circuit 275. In this example, the signal processing circuit 275 outputs the electrical signal EOS1 111 on line 161 exclusively encoded or imprinted with information of the optical signal OS1 101. (Some residual level of the optical signal OS2 102 may also be present on the line 161.) And, the signal processing circuit 275 outputs the electrical signal EOS2 112 on line 162 exclusively encoded or imprinted with information of the optical signal OS2 102. (Some residual level of the optical signal OS1 101 may also be present on the line 162.)

Accordingly and continuing with the example values from Equations A and B above, "a" and "b" can be defined via setting the output of signal processing circuit 275 on line 161 equal to OS1, that is EOS1 111=OS1 101, as follows:

$a$[Equation $A$]$-b$[Equation $B$]$=OS2$

Or:

$a[0.6(OS1\ 101)+0.4(OS2\ 102)]-b[0.4(OS1\ 101)+0.6(OS2\ 102)]=OS1$

Solving this equation yields:

$0.4(OS2\ 102)a-0.6(OS2\ 102)b=0$ $a=(3/2)b$ $0.6(OS1\ 101)a-0.4(OS1\ 101)b=OS1$ $6a-4b=10$ $b=2$ $a=3$

Values for "c" and "d" can be likewise defined via setting the output of signal processing circuit 275 on line 162 equal to OS2, that is EOS2 112=OS2 102, as follows:

$d$[Equation $B$]$-c$[Equation $A$]$=OS2$

Or:

$d[0.4(OS1\ 101)+0.6(OS2\ 102)]-c[0.6(OS1\ 101)+0.4(OS2\ 102)]=OS2$

Solving this equation yields:

$0.4(OS1\ 101)d-0.6(OS1\ 101)c=0$ $2d=3c$ $0.6(OS2\ 102)d-0.4(OS2\ 102)c=OS2$ $6d-4c=10$ $c=2$ $d=3$

Thus, in the example, "a"=3, "b"=2, "c"=2, and "d"=3.

FIG. 4H illustrates an exemplary waveform 440 for the signal 331, output from the multiplier 301, with "a" equal to 3.

FIG. 4I illustrates an exemplary waveform 445 for the signal 332, output from the multiplier 302, with "b" equal to 2.

FIG. 4J illustrates a plot 450 of the exemplary waveform 440 of the signal 331 overlaid upon the exemplary waveform 445 of the signal 332, with the shaded region 452 representing the difference between the waveforms 440 and 444 as determined by the subtraction function implemented by the adder 341 as discussed above.

FIG. 4K illustrates the output of the adder 341, which provides an electrical signal EOS1 111 encoded or imprinted with the data D1 of the optical signal OS1 101. Thus, the electrical signal EOS1 111 output by the signal processing circuit 275 exclusively, or substantially exclusively, carries the information of the optical signal OS1 101. However, some residual encoding of the data D2 or features of the optical signal OS2 102 may remain on the electrical signal EOS1 111, for example as signal artifacts.

As illustrated in FIG. 4K, the waveform 455 of the electrical signal EOS1 111 is consistent with the waveform 405 of the optical signal OS1 101. More specifically, the modulated features of the waveforms 455 and 405 are like or are substantially similar to one another. Accordingly, the electrical signal EOS1 111 tracks the optical signal OS1 101.

Figure 4L:
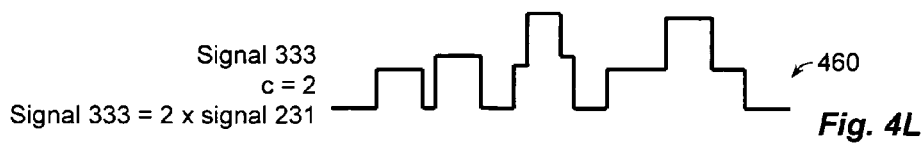
FIGS. 4A-4O, collectively
FIG. 4, are waveforms for signals flowing through a receiver in accordance with certain exemplary embodiments of the present invention.

FIG. 4L illustrates an exemplary waveform 460 for the signal 333, output from the multiplier 303, with "c" equal to 2.

Figure 4M:
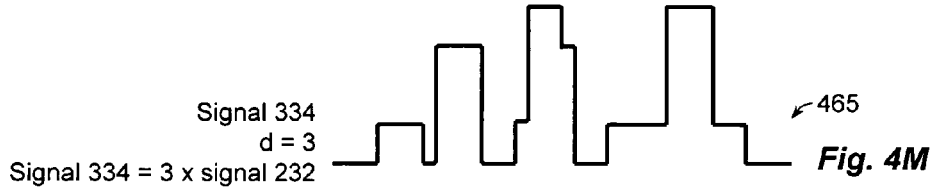

FIG. 4M illustrates an exemplary waveform 465 for the signal 334, output from the multiplier 304, with "d" equal to 3.

Figure 4N:
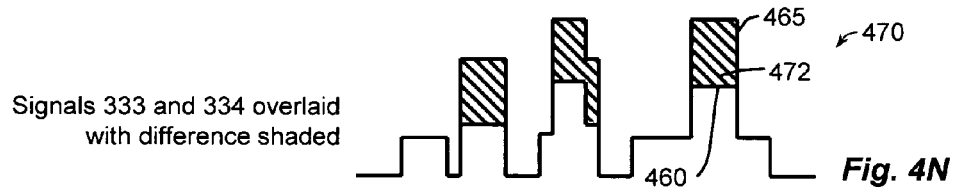

FIG. 4N illustrates a plot 470 of the exemplary waveform 460 of the signal 333 overlaid upon the exemplary waveform 465 of the signal 334, with the shaded region 472 representing the difference between the waveforms 460 and 465 as determined by the subtraction function carried out by the adder 342 as discussed above.

Figure 4O:
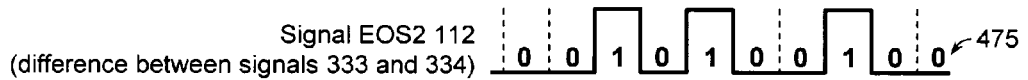
Figure 4O:
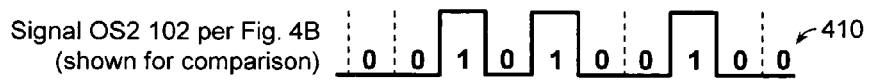

FIG. 4O illustrates the output of the adder 342, which provides an electrical signal EOS2 112 encoded or imprinted with the data D2 of the optical signal OS2 102. Thus, the electrical signal EOS2 112 output by the signal processing circuit 275 exclusively, or generally exclusively, carries the information of the optical signal OS2 102. However, some residual encoding of the data D1 or features of the optical signal OS1 101 may remain on the electrical signal EOS2 112, for example as signal artifacts.

As illustrated in FIG. 4O, the waveform 475 of the electrical signal EOS2 112 is consistent with the waveform 410 of the optical signal OS2 102. More specifically, the modulated features of the waveforms 475 and 410 are like or are substantially similar to one another. Accordingly, the electrical signal EOS2 112 tracks the optical signal OS2 102.

Thus at step 520, an exemplary embodiment of the signal processing circuit 275 performs the steps of: 1) applying a scaled version of the electrical signal 231 E(OS1+OS2) to the electrical signal 232 E'(OS1+OS2), which can be, but not necessarily is, scaled itself; and 2) applying a scaled version of the electrical signal electrical signal 232 E'(OS1+OS2) to the electrical signal 231 E(OS1+OS2), which can be, but not necessarily is, scaled itself.

Following step 520, process 500 can either end or iterate.

In certain exemplary embodiments, the signal processing circuit 275 includes compensation for nonlinearity of the detectors 211 and 212. Such compensation can be implemented via applying nonlinear compensation at the front end of the signal processing circuit 275 for example near the entrance ports associated with the lines 221 and 222. Alternatively, the factors "a," "b," "c," and "d" can comprise nonlinear parameters. Similarly, the signal processing circuit 275 can compensate for other nonlinearities that may be associated with the receiver 100, the waveguide 125, the optical signals OS1 101 and OS2 102, etc.

Certain exemplary embodiments of the signal processing circuit 275 can implement signal processing that can utilize or comprise one or more of analog signal processing, digital signal processing ("DSP"), application specific integrated circuits ("ASICs"), linear programming, computational routines, triggers, amplifiers, tunable filters, differential amplifiers, high-speed filters, finite impulse response filters ("FIRs"), phase locked loops ("PLLs"), signal conditioning circuitry, analog-to-digital conversion circuits, Kalman filtering, or other applicable signal processing techniques or devices.

The term "port," as used herein, generally refers to a place of entry or exit, a passageway, an inlet or an outlet, an entrance or an exit, an input or an output, a connection, a connection point, a passage, or a line through which signals (for example optical or electrical) or data transmit into and/or out of a device or a system.

In certain exemplary embodiments, the signal processing circuit 275 can add information to each of the electrical signals EOS1 111 and EOS2 112. Thus, each of the electrical signals EOS1 111 and EOS2 112 can convey the information of its associated optical signal, OS1 101, OS2 102 plus additional information such as control bits, addressing information, protocol overhead, bit checking information, etc.

In certain exemplary embodiments, the signal processing circuit 275 can remove information from each of the electrical signals EOS1 111 and EOS2 112 (or implement some information change). Thus, each of the electrical signals EOS1 111 and EOS2 112 can convey a subset of the total information encoded on its associated optical signal OS1 101, OS2 102.

Moreover, the electrical signal EOS1 111 and the optical signal OS1 101 can have the same payload, while the electrical signal EOS2 112 and the optical signal OS2 102 can have the same payload. Or, the payload of the electrical signal EOS1 111 can be a subset of the payload of the optical signal OS1 101, while the payload of the electrical signal EOS2 112 can be a subset of the payload of the optical signal OS2 102. Or, the payload of the optical signal OS1 101 can be a subset of the payload of the electrical signal EOS1 111, while the payload of the optical signal OS2 102 can be a subset of the payload of the electrical signal EOS2 112.

FIG. 5B illustrates a flowchart of a process 550, entitled "Set Signal Processing Parameters," for setting (or updating) signal processing parameters for the signal processing circuit 275. Process 550 can execute as part of (or during) an initialization phase of operation, upon startup, periodically, in response to a user prompt, or at some other appropriate time. Execution can be automatic, computer implemented, or manually driven. In certain exemplary embodiments, process 550 can be implemented during manufacturing of the receiver 100 via manual intervention.

At step 552 of process 550, the optical waveguide 125 transmits each of the optical signals OS1 101 individually. That is, the optical waveguide 125 transmits the optical signal OS1 101 to the receiver 100 without transmitting the optical signals OS2 102-OSN 10N. The optical waveguide 125 then transmits the optical signal OS2 102 while the optical signal OS1 101 and OS3 103-OSN 10N are not transmitting. Thus, a transmitter (not illustrated in FIGS. 1-5) steps through transmitting each of the optical signals OS1 101, OS2 102, . . . , OSN 10N.

For the example illustrated in FIGS. 2A-5A and discussed above wherein the optical waveguide 125 transmits two optical signals OS1 101 and OS2 102, executing step 552 can comprise transmitting the optical signal OS1 101 while the optical signal OS2 102 is dormant or off and then transmitting the optical signal OS2 102 while the optical signal OS1 101 is dormant or off.

Steps 555, 560, and 565 of process 550 will now be discussed in the context of this two-signal example. Those skilled in the art having benefit of this disclosure will appreciate that this disclosure supports and enables implementing and practicing process 550 with an arbitrary number of optical signals OS1 101, OS2 102, . . . , OSN 10N without undue experimentation.

At step 555, each detector 221 and 222 outputs a respective electrical signal based on the amount of the transmitting optical signal (OS1 101 or OS2 102) that is received. Thus, when only OS1 101 is transmitting, the detector 211 outputs 231 E(OS1+OS2) with OS2=0. That is, the detector 211 produces an output according to the amount of the optical signal OS1 101 that it receives. Similarly, the detector 212 outputs 232 E'(OS1+OS2) with OS2=0. That is, the detector 212 produces an output according to the amount of the optical signal OS1 101 that it receives. At this time, OS1 101 may be in a high state, transmitting a predetermined bit pattern, conveying a working payload, or carrying a random sequence, for example.

When only OS2 102 is transmitting, the detector 211 outputs 231 E(OS1+OS2) with OS1=0. That is, the detector 211 produces an output according to the amount of the optical signal OS2 102 that it receives. Similarly, the detector 212 outputs 232 E'(OS1+OS2) with OS1=0. That is, the detector 212 produces an output according to the amount of the optical signal OS2 102 that it receives. At this time, OS2 102 may be in a high state, transmitting a predetermined bit pattern, conveying a working payload, or carrying a random sequence, for example.

At step 560, the signal processing circuit 275 sets the signal processing parameters "a," "b," "c," and "d" based on the outputs from the detectors 211 and 212 during step 555. As discussed above, the optical circuit 250 and/or the detectors 211 and 212 provide(s) a wavelength-dependent response without necessarily requiring a wavelength-isolated response. If the wavelength-dependent response is unknown or changes, process 550 can identify the wavelength dependency, via monitoring detector responses for each individual incoming optical signal OS1 101, OS2 102. Accordingly, the fractions of the optical signals OS1 101 and OS2 102 that are respectively fed to the detectors 211 and 212 for optical-to-electrical conversion need not be known a priori. Process 550 can determine the fractions and set the signal processing parameters "a," "b," "c," and "d" accordingly.

In an exemplary embodiment, sending the optical signals OS1 101 and OS2 102 individually determines the factors 0.6 and 0.4 in Equation A (see above). and 0.4 and 0.6 in Equation B (see above). Then, the signal processing parameters "a," "b," "c," and "d" can be determined via solving a set of simultaneous equations as discussed above. In certain exemplary embodiments, the signal processing circuit 275 comprises the parameter adjustment module 600 (see FIG. 6) for implementing the computations. Thus, for automated execution of process 550, the receiver 100 can comprise the signal processing circuit 275' shown in FIG. 6 and discussed below.

At step 565, the signal processing parameters "a," "b," "c," and "d" can be reset based on a schedule, in response to a user prompt, or automatically upon detection of an increase in bit error rates or a decrease in signal quality. Execution of step 565 (which is optional) triggers process 550 to iterate steps 552, 555, and 560 in order to establish new or updated signal processing parameters "a," "b," "c," and "d."

Figure 6:
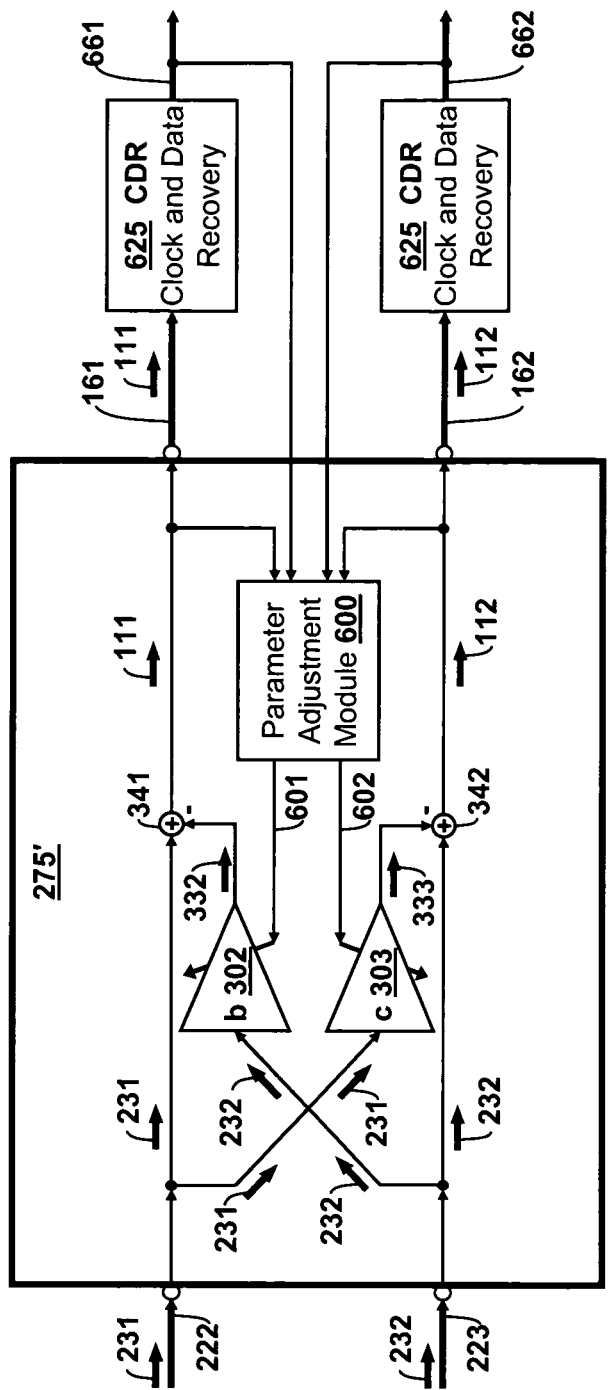
FIG. 6 is a functional block diagram for an electrical signal processing circuit of a receiver that distinguishes optical signals from one another substantially via electrical signal processing using automatically refined signal processing parameters in accordance with certain exemplary embodiments of the present invention.

Turning now to FIG. 6, this figure illustrates a functional block diagram for an electrical signal processing circuit 275' of an exemplary receiver 100 that distinguishes optical signals OS1 101, OS2 102, . . . , OSN 10N from one another substantially via electrical signal processing using automatically refined signal processing parameters according to certain embodiments of the present invention.

The signal processing circuit 275' comprises two adjustable multipliers 302 and 303 that apply an automatically settable scaling factor. The multiplier 303 scales the electrical signal 231 E(OS1+OS2) by the factor "c" which the parameter adjustment module 600 sets, as discussed below. The multiplier 302 scales the electrical signal 231 E'(OS1+OS2) by the factor "b" which the parameter adjustment module 600 also sets.

The adder 342 applies the scaled version of the electrical signal 231 E(OS1+OS2) to the electrical signal 232 E'(OS1+OS2). In an exemplary embodiment, the adder 342 determines the difference between the scaled version of the electrical signal 231 E(OS1+OS2) and the electrical signal 232 E'(OS1+OS2). The result of this difference is the electrical signal EOS2 112 imprinted substantially exclusively with the data D2.

The adder 341 applies the scaled version of the electrical signal 232 E'(OS1+OS2) to the electrical signal 231 E(OS1+OS2). In an exemplary embodiment, the adder 341 determines the difference between the scaled version of the electrical signal 232 E'(OS1+OS2) and the electrical signal 231 E(OS1+OS2). The result of this difference is the electrical signal EOS1 111 imprinted substantially exclusively with the data D1.

The clock data and recovery devices ("CDRs") 625 respectively process the electrical signals EOS1 111 and EOS2 102 to recover the data D1 and D2 for transmission respectively over the lines 611 and 662. Typically, a computing device, server, router, LAN interface, telephone, television, or some other communication or computing device receives the data D1 and D2 from the CDRs.

In certain exemplary embodiments, the receiver 100 can further comprise a serialer/deserializer ("SerDes") capability for converting the output of the CDRs from a series format, transmitted over a single line, to a parallel format for transmission over a multi-line bus. The data D1 and D2 can transmit out of the receiver 100 over 8, 16, or 32 parallel lines, with each line transmitting at a relatively low speed, for example. The multi-line transmission provides lower transmission speed over any single line thereby enhancing signal manageability. In certain exemplary embodiments, the receiver 100 comprises a decoder.

As will be discussed in further detail below, the parameter adjustment module 600 adjusts the signal processing parameters, for example the factors "b" and "c," based on signal quality information. As discussed in further detail below, in certain exemplary embodiments, the inputs and outputs of the CDRs 625 provide to the parameter adjustment module 600 with signal quality information. The parameter adjustment module 600 controls the multipliers 302 and 303 via the lines 601 and 601.

Figure 7A:
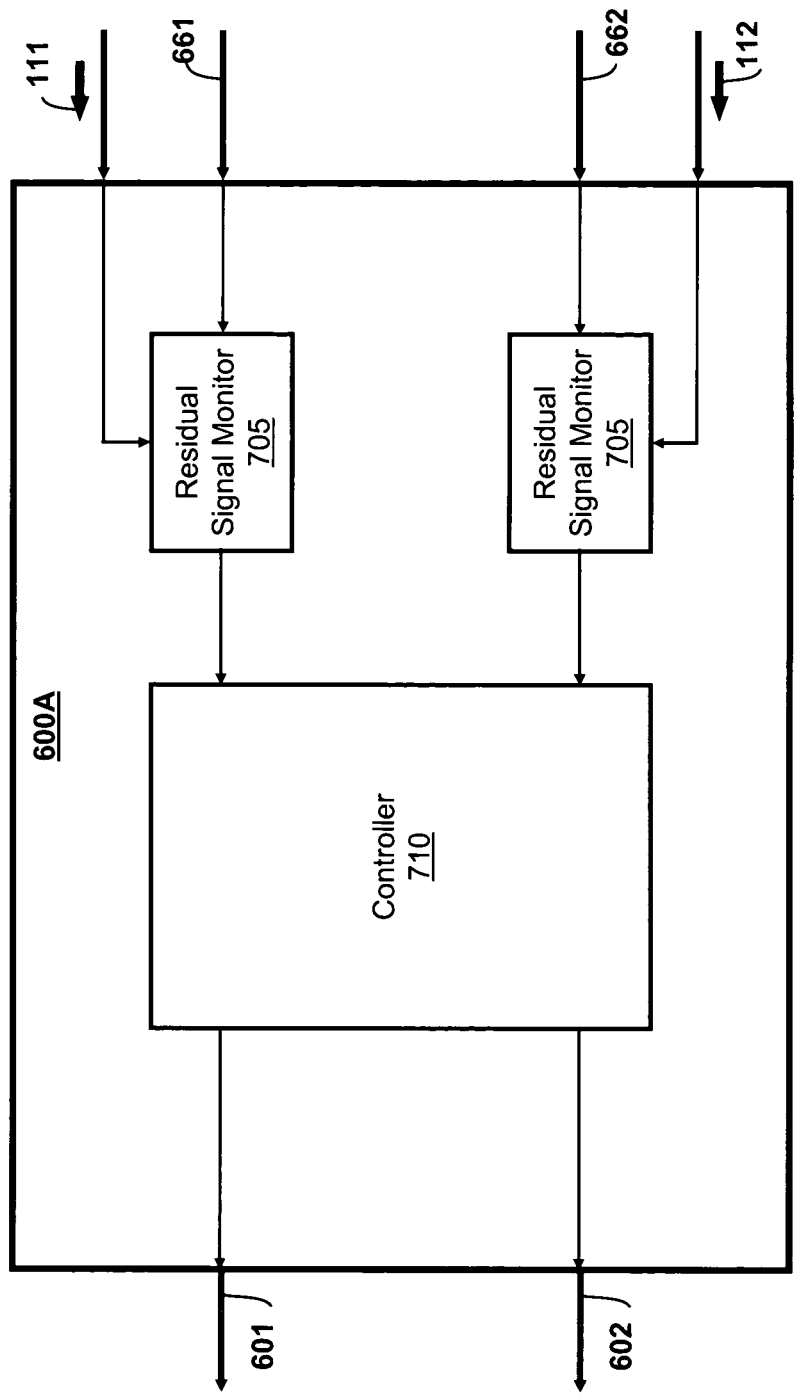
FIG. 7A is a functional block diagram of a system that automatically refines parameters for processing electrical signals to distinguish optical signals from one another in accordance with certain exemplary embodiments of the present invention.

Turning now to FIG. 7A, this figure illustrates a functional block diagram of an exemplary system 600A that automatically refines parameters (for example the parameters "b" and "c") for processing electrical signals (for example the electrical signals 231 E(OS1+OS2) and 232 E'(OS1+OS2)) to distinguish optical signals (for example the optical signals OS1 101 and OS2 102) from one another according to certain embodiments of the present invention. The system 600A represents an exemplary embodiment of the parameter adjustment module 600 illustrated in FIG. 6 as discussed above and thus will be referred to as the parameter adjustment module 600A.

The parameter adjustment module 600A comprises two residual signal monitors 705 for monitoring the quality of the electrical signals EOS1 111 and EOS2 112 as output from by the electrical signal processing circuit 275'. In certain exemplary embodiments, the residual signal monitors 705 evaluate the respective differences between the outputs of the CDRs 625 and the inputs (the signals EOS1 111 and EOS2 112 output by the signal processing circuit 275').

If the outputs of the CDRs 625 match well with (or have good correlation with) the respective outputs of the signal processing circuit 275', then signal quality can be characterized as good and the residual level of signal is low. That is, the signal processing circuit 275' is performing well, the electrical signal EOS1 111 contains minimal features of the optical signal OS2 102, and/or the electrical signal EOS2 112 contains minimal features of the optical signal OS1 101.

On the other hand, if the outputs of the CDRs 625 match poorly with (or have low correlation with) the respective outputs of the signal processing circuit 275', then the signal quality can be characterized as low and the residual level of signal is high. That is, the signal processing circuit 275' is performing at a level less than desired, the electrical signal EOS1 111 contains excessive features of the optical signal OS2 102, and/or the electrical signal EOS2 112 contains excessive features of the optical signal OS1 101.

In certain exemplary embodiments, the residual signal monitors 705 periodically observe the output of the signal processing circuit 275' and provide the controller 710 with information about the performance of the signal processing circuit 275'.

In certain exemplary embodiments, the residual signal monitors 705 are implemented in CMOS technology as features on a monolithic substrate. Each residual signal monitor can function as an eye quality monitor that essentially captures a two-dimensional map of an eye diagram. The resulting error map provides an indication of signal quality for producing an penalty or cost function to optimize the signal processing parameters of the signal processing circuit 275'. The thesis by Behnam Analui entitled "Signal Integrity Issues in High-Speed Wireline Links: Analysis and Integrated System Solutions" and labeled "in partial fulfillment of the fulfillment of the requirements for the degree of Doctor of Philosophy, California Institute of Technology, Pasadena, Calif., 2005 (defended Jul. 25, 2005)" provides additional details regarding such an eye-opening monitor providing an exemplary embodiment of the residual signal monitor 705 illustrated in FIG. 7A. That thesis is readily available on the Internet and can be readily accessed from the search tool on the website marketed under the name "GOOGLE." See Chapter 5 of that document on pages 101-123, in particular. Accordingly, one of ordinary skill in the art having benefit of the present disclosure can build and operate embodiments of the residual signal monitors 705 illustrated in FIG. 7A.

In one exemplary embodiment, a bit error rate tester ("BERT") or an optical spectrum analyzer, such as a piece of test equipment available from Agilent, Ando/Yokogawa, Anritsu, or JDSU, functions as the residual signal monitors 705. In this manner, signal processing parameters can be set based on laboratory-style measurements that may be conducted at a station of a manufacturing production line.

Based on performance information from the residual signal monitors 705, the controller 710 refines, controls, manipulates, adjusts, sets, updates, changes, or tunes the signal processing parameters (for example "b" and "c" as illustrated in FIG. 6) of the signal processing circuit 275'. In other words, the controller 710 makes dynamic changes or updates in order to reduce unwanted residual signal features (for example signal artifacts or signal imprints), thereby refining or improving the signals EOS1 111 and EOS2 112 output by the signal processing circuit 275'.

Via such dynamic updates, the receiver 100 compensates for changes in operating conditions or operating environment, such as variations in the individual power levels of the incoming optical signals OS1 101, OS2 102, . . . , OSN 10N, thermal drift, temperature shift, aging of the detectors 211 and 212 (or some other element), changes in optical dispersion of material through which the optical signals OS1 101 and OS2 102 propagate, amplitude fluctuation, fluctuations in power supplies, etc.

As discussed above, each residual signal monitor 705 provides an indication of the quality of the signal output by the signal processing circuit 275'. If the signals EOS1 111 and EOS2 112 output by the signal processing circuit 275' are high quality or high fidelity, then the controller 710 determines that the signal processing circuit 275' is applying appropriate signal processing parameters. According, the controller 710 makes little or no change to the signal processing parameters.

On the other hand, the signal processing circuit 275' may be in an operational state in which its performance is declining or warrants improvement. In such an operational state, one or both of the residual signal monitors 705 determine that one or both of the electrical signals EOS1 111 and EOS2 112 contain deleterious residual imprints, jitter, or some other signal deficiency, defect, or artifact. In this situation, the controller 710 adjusts the respective signal processing parameters to improve the performance of the signal processing circuit 275' and the quality of the electrical signals EOS1 111 and EOS2 112.

Thus, the residual signal monitors 705 provide the controller 710 with a performance signal that indicates how well the signal processing of the signal processing circuit 275' is distinguishing, separating, and/or isolating electrical versions of the optical signals OS1 101 and OS2 102 from one another. If the performance signal indicates that the signal processing is substantially inadequate, the controller 710 applies high levels of correction to the signal processing parameters. If the performance signal indicates better but still inadequate performance, then the controller 710 makes less aggressive corrections. Those corrections may be positive or negative, for example. If the signal processing performance as determined by the residual signal monitors 705 is within a dead band or a designated range of values, the controller 710 may provide no corrections.

Accordingly, the parameter adjustment module 600A comprises a feedback control loop for setting signal processing parameters of the signal processing circuit 275'. Thus, the controller 710 makes dynamic changes or updates to optimize, to continually improve, or to adjust signal processing settings of the receiver 100.

In an exemplary embodiment, the controller 710 can comprise an automatic control circuit or program, which may be digital or analog or a hybrid between digital and analog. In one exemplary embodiment, the controller 710 comprises a proportional plus integral ("PI") controller. In one exemplary embodiment, the controller 710 comprises a proportional plus integral plus derivative ("PID") controller. Certain exemplary embodiments of the controller 710 can comprise a penalty function for manipulating the signal processing parameters, for example. In various exemplary embodiments, the controller 710 can comprise one or more Kalman filters, stochastic filters, deadbeat controllers, partial least squares ("PLS") routines, multivariate controllers, non-linear controllers, linear controllers, statistical analyzers, statistical correlation routines, least-squares computations, anti-reset windup provisions, feed forward corrections, optimizers, optimal controllers, predictive controllers, robust controllers, digital controllers, analog controllers, artificial intelligent programs, fuzzy logic routines, neural networks, cascaded control systems, microprocessor-based control systems, or some other effective feedback control loop or automatic control means, for example.

In one exemplary embodiment, the controller 710 manipulates the signal processing parameters via parameter search methodology described or disclosed in U.S. Pat. No. 7,158,567 to Wang et al. For example, that patent describes, inter alia, processes for manipulating a signal processing parameters in connection with forward error correction ("FEC"). One of ordinary skill in the art having benefit of the present disclosure would be able to incorporate one (or more) of those processes from U.S. Pat. No. 7,158,567 into the controller 710 for controlling the signal processing parameters of the signal processing circuit 275' without undue experimentation.

In an exemplary embodiment, in support of storing and operating feedback control instructions, the controller 710 can comprise a microprocessor (not shown) or other digital circuitry such as flash memory, random access memory ("RAM"), a digital-to-analog converter ("DAC"), an analog-to-digital converter ("ADC"), etc. Flash memory can support software revisions or upgrades transmitted over the optical waveguide 125 to the receiver 100. The controller 715 can utilize RAM for data storage and program execution. An ADC can digitize analog signals that may characterize performance or represent error. Prior to digitization, such signals can be filtered to damp, smooth, or average high-frequency variation. In certain exemplary embodiments, the controller 710 can have a response time in a range of milliseconds, seconds, or perhaps some larger unit of time. A DAC can generate control voltages or currents that manipulate, manage, or control the multipliers 302 and 303 (or some other signal processing elements such as one or more variable delays, phase shifters, synchronizing elements, or adjustable filters, for example). In certain exemplary embodiments, the controller 710 comprises one or more timers for managing pulses, measuring time between signal events, or helping control signal synchronization, for example.

A variable delay can compensate for differences in signal propagation time between signal paths of the signal processing circuit 275'. For example, a variable delay can provide synchronization between the electrical signal 333 and the electrical signal E'(OS1+OS2) 232 at the adder 342, to provide matching phase and timing as illustrated in the signal plots of FIG. 4. In other words, at the adders 341 and 342, the adder inputs are timed and phase matched to one another so as to subtract out signal features as discussed above. A variable delay can be inserted in series with each of the multipliers 302 and 303.

Exemplary suppliers of variable delay lines include: ELMEC Technology of America, Inc. of San Mateo, Calif.; Maxim Integrated Products, Inc. of Sunnyvale, Calif.; and Data Delay Devices, Inc. of Clifton, N.J.

U.S. Pat. No. 6,028,462, issued Feb. 22, 2000 to Kyles, describes tunable delay technology that may be incorporated into an exemplary embodiment of the signal processing circuit 275'.

In certain exemplary embodiments, the signal processing circuit 275 comprises a filter for shaping the electrical signal 333 to match the features of the electrical signal E'(OS1+OS2) 232 that are to be eliminated via subtraction. Such a filter may be beneficial in certain exemplary embodiments to compensate for different frequency responses of the detectors 211 and 212, different signal frequency contents, "roll off," etc. In an exemplary embodiment, the filter can attenuate (or amplify) high-frequency signal components, low-frequency signal components, or a specific frequency band. In an exemplary embodiment, the filter can apply frequency-selective gain or attenuation to improve signal negation or cancellation implemented at the adders 341 and 342. In one exemplary embodiment, the filter provides a transformation, e.g. in the frequency domain, that approximates frequency dependent effects of the receiver 100.

The filter can be a separate component or features of an integrated circuit. A filter can be inserted in series with each of the multipliers 302 and 303. In one exemplary embodiment, such filters are adjustable, tunable, or controllable. Each filter can be located before, between, or after the variable delay discussed above and the multiplier (302 or 303). Alternatively, each multiplier 302 and 303 can comprise the filter. The filter(s) can apply a tunable or adjustable amount of gain or attenuation over a preset or an adjustable set of frequencies/bandwidths. In one exemplary embodiment, each filter comprises a finite impulse filter. In one exemplary embodiment, each filter comprises a tapped delay line or an adaptive tapped delay line filter.

In one exemplary embodiment, each filter comprises a voltage controlled filter whose operating characteristics can be controlled via a control voltage applied to an input terminal of the filter. Each filter's "Q factor" and/or cutoff frequency (or cut-on frequency) can be varied continuously. Further, each filter may be switched between operating in two or more modes, such as among low-pass, high-pass, band-pass, and notch modes. Each filter may provide a switchable slope that impacts how quickly certain signals (e.g. those outside the pass band) become attenuated.

U.S. Pat. No. 6,545,567, issued Apr. 8, 2003 to Pavan et al., provides additional information about exemplary embodiments of programmable analog tapped delay line filters. Similarly, U.S. Pat. No. 7,158,567, issued Jan. 2, 2007 to Wang et al., provides information about exemplary filters that can be controlled to shape or otherwise manage a signal. An exemplary embodiment of the signal separation system 180 can comprise one or more of the technologies disclosed in U.S. Pat. Nos. 6,545,667 and 7,158,567.

The controller 710 can connect to, comprise, or otherwise access assorted types of memory that may hold instructions. Such memory can include any one or combination of volatile memory elements (e.g., forms of RAM such as DRAM, SRAM, SDRAM, etc.), nonvolatile memory elements (e.g., ROM, hard drive, tape, compact disc read-only memory ("CDROM"), etc.), and erasable memory (e.g. erasable programmable read only memory ("EPROM") and electrical EPROM ("EEPROM")). Moreover, the controller 710 may incorporate electronic, magnetic, optical, and/or other types of storage media and can have a distributed architecture, where various components are situated remote from one another, but can be accessed over a network. Instructions for operating the controller 710, including parameter optimization routines, can be stored in a computer-readable medium.

A "computer-readable medium" can be any means that can store, communicate, propagate, or transport a program for use by or in connection with an instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more associated wires or traces, a portable computer diskette (magnetic), a RAM (electronic), a read-only memory ("ROM") (electronic), an erasable programmable read-only memory (EPROM, EEPROM, or Flash memory) (electronic), a data stick, and a portable CDROM (optical). Note that a computer-readable medium could even be paper or another suitable medium upon which the program is printed, as the program can be electronically captured, via for instance optically scanning the paper or other medium, then compiled, interpreted or otherwise processed in a suitable manner if necessary, and then stored in a computer memory.

The controller 710 can also include logic implemented in hardware with any or a combination of the following technologies: a discrete logic circuit(s) having logic gates for implementing logic functions upon data signals, an application-specific integrated circuit ("ASIC") having appropriate combinational logic gates, a programmable gate array(s) ("PGA"), a field programmable gate array ("FPGA"), etc.

It should be apparent that one of ordinary skill in the art would be able to make and operate the controller 710 (as well as the other items described herein associated with exemplary embodiments of the present invention) without difficulty and without undue experimentation based on the figures, illustrations, exemplary functional block diagrams, flow charts, and associated descriptions in the application text, for example. Therefore, additional disclosure of a particular set of program code instructions or more particularized circuit schematics for the controller 710 is not considered necessary for an adequate understanding of how to make and use the present invention.

Figure 7B:
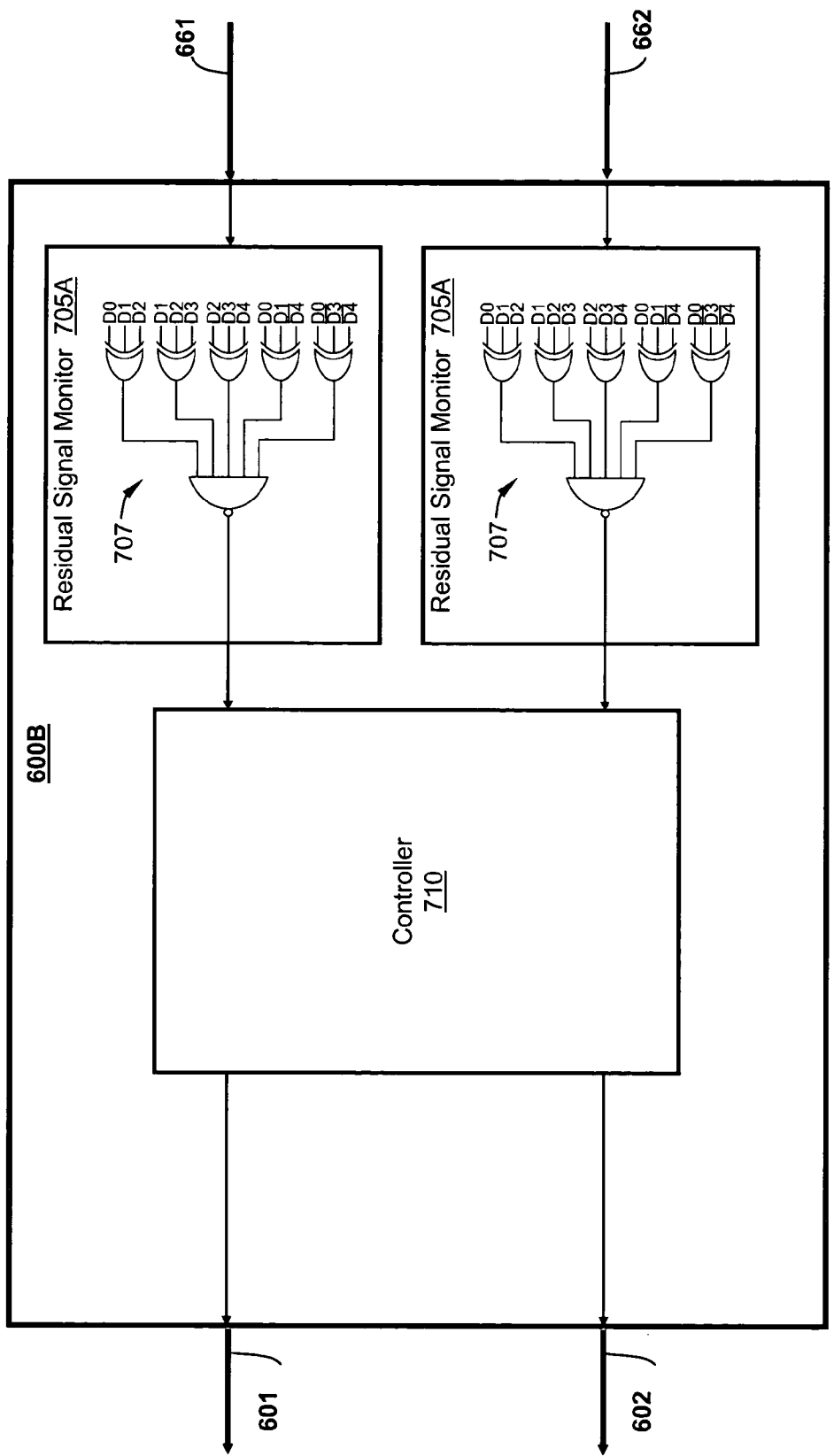
FIG. 7B is a functional block diagram of a system that automatically refines parameters for processing electrical signals to distinguish optical signals from one another in accordance with certain exemplary embodiments of the present invention.

Turning now to FIG. 7B, this figure illustrates a functional block diagram of an exemplary system 600B that automatically refines parameters (for example the parameters "b" and "c") for processing electrical signals (for example the electrical signals 231 E(OS1+OS2) and 232 E'(OS1+OS2)) to distinguish optical signals (for example the optical signals OS1 101 and OS2 102) from one another according to certain embodiments of the present invention. The system 600B represents an exemplary embodiment of the parameter adjustment module 600 illustrated in FIG. 6 as discussed above and thus will be referred to as the parameter adjustment module 600B.

For the exemplary embodiment of the parameter adjustment module 600B illustrated in FIG. 7B, the CDRs 625 (see FIG. 6) typically over sample the respective electrical signals EOS1 111 and EOS2 102 output from the signal processing circuit 275'. Over sampling can comprise sampling at a clock rate that is higher than the data rate. Over sampling a data stream can be implemented using a reference clock having a clock rate that is higher than the data stream's data rate. In various exemplary embodiments, the CDRs 624 can over sample at a factor of about 1.1, 1.5, 2.0, 2.5, 3, 5, 10, or 25 (or in a range between any two of these values) above the data rate of the optical signals OS1 101, OS2 102, OS3 103, . . . , OSN 10N. For embodiments, in which the optical signals OS1 101, OS2 102, OS3 103, . . . , OSN 10N have different data rates, the CDRs 624 can sample faster than the highest optical signal data rate.

Accordingly, the CDRs 625 provide the residual signal monitors 705A with sampling data. Each residual signal monitor 705A includes a logical circuit 707. Each of the logical circuits 707 processes five samples of incoming data, denoted D0, D1, D2, D3, and D4. Each logical circuit 707 determines whether the five-sample sequence includes at least three consecutive samples within an eye diagram. If at least three consecutive samples are inside the open portion of the eye diagram (indicating an open eye diagram typical of a high-quality signal), then the controller 710 maintains the current set of signal processing parameters for the relevant portion of the signal processing circuit 275'. If the five-sample sequence does not include three consecutive samples in the eye diagram opening, then the controller 710 can change the signal processing parameters, particularly if this condition occurs repetitively. In an exemplary embodiment, a high output from the logical circuit 707 indicates high signal quality (a low propensity for bit errors), while a low output indicates lower signal quality (a higher propensity for bit errors).

In certain exemplary embodiments, the controller 710 contains a lookup table with multiple sets of signal processing parameters. The controller 710 retrieves and implements signal processing parameters from that lookup table according to signal quality as determined by the length or fraction of time that the residual signal monitor 705A provides a high output (or alternatively a low output). When the output of the residual signal monitor 705A is high for an extended period of time, for example for longer than a threshold percentage of time within a preset time span, then the controller 710 feeds the signal processing circuit 275' a particular set of signal processing parameters from the lookup table. When the output is low, as indicative of an abnormal eye diagram (and/or an increased probability of bit errors), then the controller 710 accesses and implements a different set of signal processing parameters.

U.S. Patent Application Publication Number 2008/0019435, published Jan. 24, 2008 an entitled "Adaptive Equalizer Apparatus with Digital Eye-Opening Monitor Unit and Method Thereof," provides additional information relevant to the exemplary residual signal monitor 705A illustrated in FIG. 7B.

Figure 7C:
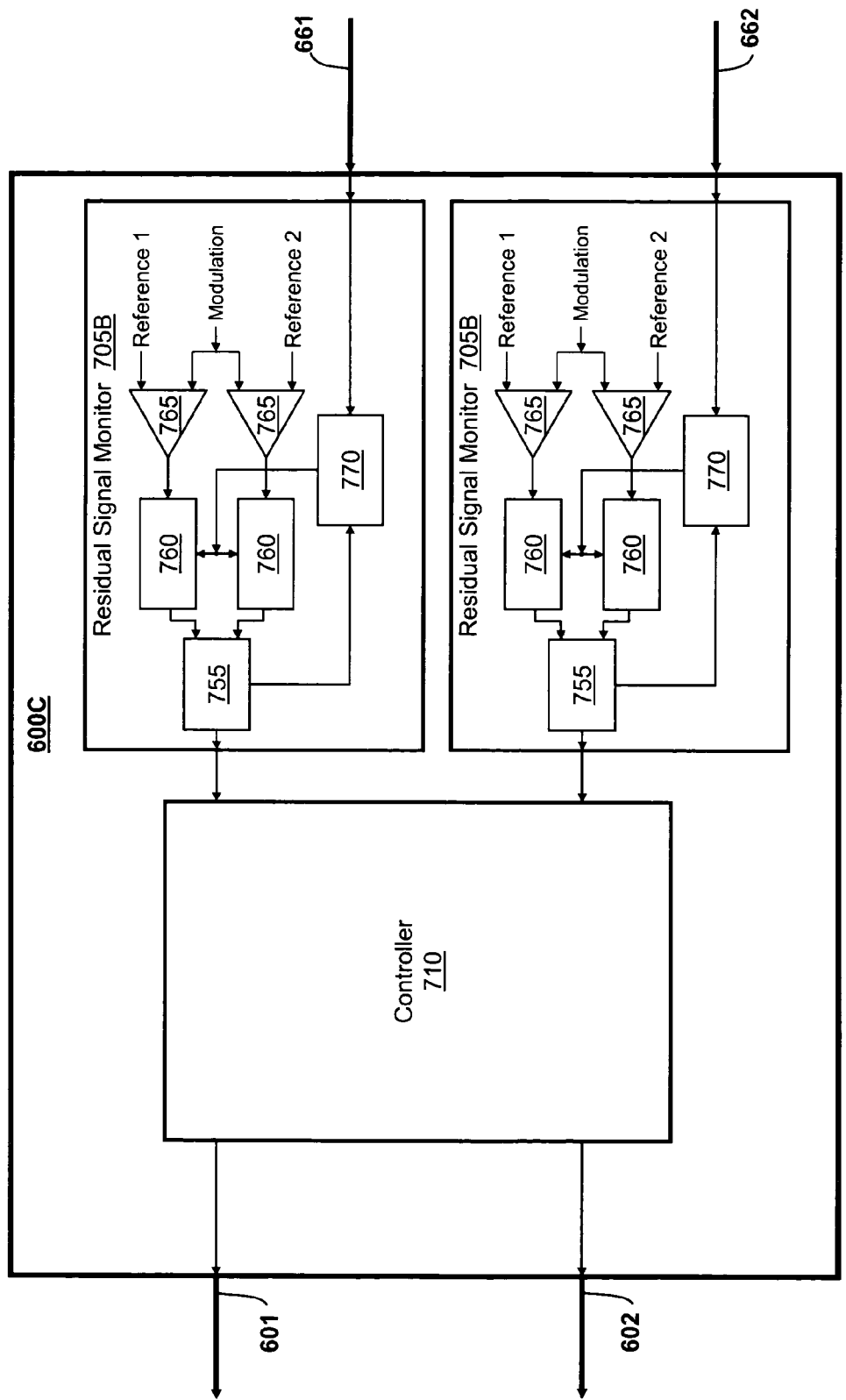
FIG. 7C is a functional block diagram of a system that automatically refines parameters for processing electrical signals to distinguish optical signals from one another in accordance with certain exemplary embodiments of the present invention.

Turning now to FIG. 7C, this figure illustrates a functional block diagram of an exemplary system 600C that automatically refines parameters (for example the parameters "b" and "c") for processing electrical signals (for example the electrical signals 231 E(OS1+OS2) and 232 E'(OS1+OS2)) to distinguish optical signals (for example the optical signals OS1 101 and OS2 102) from one another according to certain embodiments of the present invention. The system 600C represents an exemplary embodiment of the parameter adjustment module 600 illustrated in FIG. 6 as discussed above and thus will be referred to as the parameter adjustment module 600C.

The parameter adjustment module 600C comprises the residual signal monitors 705B. Each residual signal monitor 705B comprises two comparators 765 determining eye diagram height. A phase interpolator 770 determines eye diagram width. The sampling stages 760 sample outputs of the comparators 765 and the interpolator 770. The control circuit 755 provides an indication of eye diagram width and height to the controller 710. If the eye diagram opening is high and wide, then signal quality can be assessed as high (indicative of low levels of residual signal). If the eye diagram opening is narrow and/or short, then signal quality can be assessed as low or declining (indicative of high residual signal and/or a high potential for bit errors). As discussed above, the controller 710 manipulates the signal processing parameters of the signal processing circuit 275' in order to achieve and/or maintain high signal quality. Manipulating signal parameters can include dynamically changing delay, phase, timing, amplifier gain, filtering parameters, multiplier constants, offsets, etc. to improve signal quality.

Turning now to FIG. 8, this figure illustrates a flowchart of an exemplary process 800 for refining signal processing parameters in support of distinguishing optical signals OS1 101, OS2 102, ..., OSN 10N from one another via signal processing substantially conducted in the electrical domain according to certain embodiments of the present invention. Process 800 will be discussed below with exemplary reference to FIGS. 6, 7A, 7B, and 7C, in accordance with the foregoing discussion. In certain exemplary embodiments, the controller 800 executes process 800 automatically, for example using computer-implemented instructions. Such instructions are typically, but not necessarily, executed on a microprocessor or other programmable logic device of the receiver 100.

At step 805 of process 800, which is entitled "Refine Signal Processing Parameters," the residual signal monitors 705, 705A, or 705B monitor signal quality for the electrical signals EOS1 111 and EOS2 112 output by the signal processing circuit 275'. Monitoring signal quality can comprise determining residual or unwanted signal artifacts, monitoring opening of an eye diagram, monitoring bit errors or bit error rates, comparing the input to the output of the CDR(s) 625, assessing jitter, or evaluating the "load" of the CDR(s) 625 or the level of work that the CDR(s) 625 must perform to recover the data D1 and/or D2, for example (not an exhaustive list).

At step 810, the controller 710 randomly varies each signal processing parameter of the signal processing circuit 275'. As discussed above, such settable signal processing parameters can include scaling factors, gains, multipliers, offsets, corrections, filtering, time constants, roll off parameters, delays, phase shifts, timing constants, lead/lag effects, "a," "b," "c," and/or "d," for example (not an exhaustive accounting of possibilities). In certain exemplary embodiments, each signal processing parameters is varied independently. Alternatively, multiple signal processing parameters can be simultaneously varied.

Randomly varying the signal processing parameters can comprise injecting white noise, making some change based on a random number generator, or bumping the parameter by an amount and in a positive or negative direction that has at least some level of randomness, for example. (Alternatively, the change can be in a predefined direction and/or by a predefined amount).

At inquiry step 815, the controller 710 determines whether a threshold number of like or similar random changes have produced a statistically significant change in the quality of the signal EOS1 111, or EOS2 112. The controller 710 typically tracks the magnitude and direction (e.g. positive or negative) of the random changes and then correlates those changes to monitored signal quality. Thus, the controller 710 may evaluate whether small positive changes in any particular signal processing parameter have improved signal quality, while negative changes to that parameter have resulted in a decrease in signal quality. Similarly, the controller 710 can determine whether large positive and negative changes have had a positive or negative impact on signal quality. In certain exemplary embodiments, via monitoring the result of random changes, the controller 710 can be viewed as creating a "map" of signal quality as correlated to changes in signal processing parameters.

If the controller 710 has not observed a substantive change in monitored signal quality, then process 800 loops back to step 805 and iterates. That is, the controller 710 continues monitoring signal quality and continues making random changes to the signal processing parameters. If, on the other hand, the controller 710 observes a significant change in signal quality associated with the random changes, then step 820 executes.

At step 820, the controller 710 increases or decreases the signal processing parameter(s) to improve signal quality. The parameter changes implemented at step 820 typically are sustained. That is, the controller 710 implements those changes to refine or optimize operation of the signal processing circuit 275'. Subsequent random changes (in a subsequent iteration of process 800) will be random deviations from the new signal processing parameters.

For example, if the residual signal monitors 705, 705A, or 705B observed an increase in signal quality when "c" was randomly increased and observed a decrease in signal quality when "c" was randomly decreased, then the controller 710 could implement an long-term increase in "c." Rules can govern criteria or thresholds for statistical significance. For example, the controller 710 might take corrective action when signal quality improvements occurred for 90 percent of the increases in "c" and decreases in signal quality occurred for 90 percent of decreases in "c" over a period of time. That period of time could be between one and ten seconds, ten to hundred seconds, or some time measured in minutes, hours, days, milliseconds, microseconds, etc.

Following execution of step 820, process 800 loops back to step 805 and continues monitoring signal performance, making random changes to signal processing parameters, and implementing sustained changes in signal processing parameters aimed at refining the parameters.

Turning now to FIGS. 9 and 10, these figures provide additional information regarding exemplary receiver embodiments that receive an arbitrary number of optical signals OS1 101, OS2 102, ..., OSN 10N as initially discussed with respect to FIG. 1 above. Now that a two-signal embodiment has been discussed in detail with respect to FIGS. 2A-8, additional information and teachings will be provided about implementations and applications involving an arbitrary number of WDM, CWDM, and/or DWDM channels. Accordingly, exemplary embodiments of the present invention can discriminate 2, 8, 16, 32, 64, 128, or 256 optical signals OS1 101, OS2 102, ..., OSN 10N from one another (or in a range spanning between any two of those numbers, for example) via signal processing substantially implemented in the electrical domain.

Referring now to FIG. 9, this figure illustrates a functional block diagram of an exemplary receiver 100 that receives multiple optical signals OS1 101, OS2 102, OS3 103, ..., OSN 10N carrying information at different wavelengths and that emits multiple electrical signals EOS1 111, EOS2 112, EOS3 113, ..., EOSN 11N, each carrying the information of one of the optical signals OS1 101, OS2 102, OS3 103, ..., OSN 10N according to certain embodiments of the present invention.

The optical signals OS1 101, OS2 102, OS3 103, ..., OSN 10N arrive at the receiver 100 via propagation over a common medium, specifically the optical waveguide 125, which is typically but not necessarily a single mode optical fiber. The optical circuit 250 feeds multiple ones of the optical signals OS1 101, OS2 102, OS3 103, ..., OSN 10N to each of the detectors 211, 212, 213, ..., 21N.

Thus, each detector 211, 212, 213, ..., 21N receives at least two of the signals OS1 101, OS2 102, OS3 103, ..., OSN 10N and converts those received signals into the electrical domain. In certain exemplary embodiments, each detector 211, 212, 213, ..., 21N receives at least three of the optical signals OS1 101, OS2 102, OS3 103, ..., OSN 10N.

In certain exemplary embodiments, each detector 211, 212, 213, ..., 21N receives at least four of the optical signals OS1 101, OS2 102, OS3 103, ..., OSN 10N. In certain exemplary embodiments, each detector 211, 212, 213, ..., 21N receives at least five of the optical signals OS1 101, OS2 102, OS3 103, ..., OSN 10N. In certain exemplary embodiments, each detector 211, 212, 213, ..., 21N receives at least six of the optical signals OS1 101, OS2 102, OS3 103, ..., OSN 10N. In certain exemplary embodiments, each detector 211, 212, 213, ..., 21N receives at least seven of the optical signals OS1 101, OS2 102, OS3 103, ..., OSN 10N. In certain exemplary embodiments, each detector 211, 212, 213, ..., 21N receives at least eight of the optical signals OS1 101, OS2 102, OS3 103, ..., OSN 10N. In certain exemplary embodiments, each detector 211, 212, 213, ..., 21N receives at least ten of the optical signals OS1 101, OS2 102, OS3 103, ..., OSN 10N. In certain exemplary embodiments, each detector 211, 212, 213, ..., 21N receives at least sixteen of the optical signals OS1 101, OS2 102, OS3 103, ..., OSN 10N. In certain exemplary embodiments, each detector 211, 212, 213, ..., 21N receives at least thirty-two of the optical signals OS1 101, OS2 102, OS3 103, ..., OSN 10N. In certain exemplary embodiments, each detector 211, 212, 213, ..., 21N receives at least sixty-four of the optical signals OS1 101, OS2 102, OS3 103, ..., OSN 10N. In certain exemplary embodiments, each detector 211, 212, 213, ..., 21N receives a number of the optical signals OS1 101, OS2 102, OS3 103, ..., OSN 10N within a range between any two of the numbers in this paragraph.

In certain exemplary embodiments, the optical circuit 250 feeds all of the optical signals OS1 101, OS2 102, OS3 103, ..., OSN 10N to each of the detectors 211, 212, 213, ..., 21N. Thus, any one detector 211, 212, 213, ..., 21N can receive a portion of each of the optical signals OS1 101, OS2 102, OS3 103, ..., OSN 10N.

In certain exemplary embodiments, the optical circuit 250 divides the optical signals OS1 101, OS2 102, OS3 103, ..., OSN 10N into groups or bands of adjacent optical signals OS1 101, OS2 102, OS3 103, ..., OSN 10N. Each group can have four, five, eight, ten, sixteen, twenty, or twenty-five optical signals OS1 101, OS2 102, OS3 103, ..., OSN 10N, for example. In certain exemplary embodiments, the groups are reasonably isolated in wavelength from one another. For example, a cascade of thin-film filters can separate the optical signals OS1 101, OS2 102, OS3 103, ..., OSN 10N into groups of four optical signals OS1 101, OS2 102, OS3 103, ..., OSN 10N. Thus, the optical signals OS1 101, OS2 102, OS3 103, and OS4 104 can form a first group, with the optical signals OS5 105, OS6 106, OS7 107, and OS8 108 forming a second group, the optical signals OS9 109, OS10 1010, OS11 1011, and OS12 1012 forming a third group, and so on.

In such embodiments, each detector 211, 212, 213, ..., 21N can receive light from one of the groups. The detectors 211, 212, 213, and 214 can each receive portions of the optical signals OS1 101, OS2 102, OS3 103, and OS4 104 of the first group. That is, the detector 211 receives portions of the optical signals OS1 101, OS2 102, OS3 103, and OS4 104; the detector 212 receives portions of the optical signals OS1 101, OS2 102, OS3 103, and OS4 104; the detector 213 receives portions of the optical signals OS1 101, OS2 102, OS3 103, and OS4 104; and the detector 214 receives portions of the optical signals OS1 101, OS2 102, OS3 103, and OS4 104. Similarly, the detectors 215, 216, 217, and 218 can each receive portions of the optical signals OS5 105, OS6 106, OS7 107, and OS8 108 of the second group, while the detectors 219, 2110, 2111, and 2112 can each receive portions of the optical signals OS9 109, OS10 1010, OS11 1011, and OS12 1012 of the third group, and so forth.

Each detector 211, 212, 213, ..., 21N converts the light that it receives (whether from two, three, a group of four or more, or all of the optical signals OS1 101, OS2 102, OS3 103, ..., OSN 10N) into the electrical domain. Thus, the detector 211 outputs the electrical signal $E_1(OS1+OS2+OS3+...+OSN)$ 901; the detector 212 outputs the electrical signal $E_2(OS1+OS2+OS3+...+OSN)$ 902; the detector 213 outputs the electrical signal $E_3(OS1+OS2+OS3+...+OSN)$ 903; the detector 214 outputs the electrical signal $E_4(OS1+OS2+OS3+...+OSN)$ 904; and the detector 21N outputs the electrical signal $E_N(OS1+OS2+OS3+...+OSN)$ 90N [where "N" can be 2, 3, 4, 6, 8, 10, 16, 32, 64, 128, etc.]. Those skilled in the art having benefit of this disclosure will appreciate that the adopted notation is not intended to imply that any one detector 211, 212, ..., 21N must receive all of the energy in each optical signal 101, 102, ..., 10N it receives. Rather, each detector 211, 212, ..., 21N typically receives a portion of the energy in multiple optical signals 101, 102, ..., 10N and converts that energy into a composite electrical signal 901, 901, ..., 90N. In other words, the energy of any one optical signal 101, 102, ..., 10N can be distributed among multiple detectors.

The signal processing circuit 275" processes the electrical signals $E_1(OS1+OS2+OS3+...+OSN)$ 901, $E_2(OS1+OS2+OS3+...+OSN)$ 902, $E_3(OS1+OS2+OS3+...+OSN)$ 903, $E_4(OS1+OS2+OS3+...+OSN)$ 904, ..., $E_N(OS1+OS2+OS3+...+OSN)$ 90N. Via this processing, the signal processing circuit 275" produces the electrical signals EOS1 111, EOS2, 112, EOS3 113, ..., EOSN 11N on respective lines 161-16N. Each of those electrical signals EOS1 111, EOS2, 112, EOS3 113, ..., EOSN 11N conveys the information of a corresponding one of the optical signals OS1 101, OS2, 102, OS3 103, ..., OSN 10N, with little or no conflicting information, imprinting or encoding from the other optical signals OS1 101, OS2, 102, OS3 103, ..., OSN 10N.

Referring now to FIG. 10, this figure illustrates functional block diagram for an exemplary electrical signal processing circuit 275" of a receiver 100, wherein the circuit 275" processes multiple electrical signals 901, 902, 903, ..., 90N each encoded with multiple distinct patterns of information, to produce multiple other electrical signals 111, 112, 113, ..., 11N each encoded with exactly one of the distinct patterns of information according to certain embodiments of the present invention.

The signal processing circuit 275" taps each of the electrical signals $E_1(OS1+OS2+OS3+...+OSN)$ 901, $E_2(OS1+OS2+OS3+...+OSN)$ 902, $E_3(OS1+OS2+OS3+...+OSN)$ 903, $E_4(OS1+OS2+OS3+...+OSN)$ 904, ..., $E_N(OS1+OS2+OS3+...+OSN)$ 90N, applies respective scaling factors, and applies the scaled results to scaled versions of the other electrical signals 901, 902, 903, ..., 90N, as illustrated in FIG. 10.

The electrical signal $E_1(OS1+OS2+OS3+...+OSN)$ 901 is scaled by the factors $B_{11}, B_{12}, ..., B_{1N-1}$. The scaled results are respectively fed to and subtracted from the other electrical signals $E_2(OS1+OS2+OS3+...+OSN)$ 902, $E_3(OS1+OS2+OS3+...+OSN)$ 903, $E_4(OS1+OS2+OS3+...+OSN)$ 904, ..., $E_N(OS1+OS2+OS3+...+OSN)$ 90N, which have been respectively scaled by the factors $A_2, A_3, ..., A_N$ in advance, as illustrated in FIG. 10. This subtraction effectively removes unwanted data imprinting or encoding.

Similarly, the electrical signal $E_2(OS1+OS2+OS3+...+OSN)$ 902 is scaled by the factors $B_{21}, B_{22}, ..., B_{2N-1}$ and fed respectively to and subtracted from scaled versions of the other electrical signals $E_1(OS1+OS2+$ OS3+ ... +OSN) 901, $E_3$(OS1+OS2+OS3+ ... +OSN) 903, $E_4$(OS1+OS2+OS3+ ... +OSN) 904, ..., $E_N$(OS1+OS2+OS3+ ... +OSN) 90N as illustrated in FIG. 10.

Thus, each electrical signal 901, 902, 903, ..., 90N is processed by a respective multiplier 1001, 1002, 1003, ... 100N that applies a respective scaling factor $A_1, A_2, A_3, ..., A_N$ to produce a respective electrical signal 1091, 1092, 1093, ..., 109N. Each electrical signal 901, 902, 903, ..., 90N is also scaled by an array of scaling factors ($B_{11}, B_{12}, ..., B_{1N\text{-}1}; B_{21}, B_{22}, ..., B_{2N\text{-}1}; B_{31}, B_{32}, B_{3N\text{-}1}; B_{N1}, B_{N2}, ..., B_{NN\text{-}1}$) and the results are subtracted from the electrical signals 901, 902, 903, ..., 90N. (The scaling of the factors $B_{11}, B_{12}, ..., B_{1N\text{-}1}; B_{21}, B_{22}, ..., B_{2N\text{-}1}; B_{31}, B_{32}, ..., B_{3N\text{-}1}; B_{N1}, B_{N2}, ..., B_{NN\text{-}1}$ can be implemented via various embodiments of multipliers as discussed above with respect to previous figures. Similarly, the subtractions can be implemented as discussed above.)

In this manner, the electrical circuit 275" removes from each electrical signal 901, 902, 903, ..., 90N the contributions of all but one of the optical signals OS1 101, OS2 102, OS3 103, ..., OSN 10N. Thus, each electrical signal 111, 112, 113, ..., 11N output by the electrical circuit 275" conveys the information of one optical signal 101, 102, 103, ..., 10N.

Certain exemplary embodiments of the electrical circuit 275" can effectively solve linear equations or implement matrix mathematics. Thus, the signals electrical signals 901, 902, 903, ..., 90N can be characterized as a vector E'. The electrical signals 111, 112, 113, ..., 11N can be characterized as a one-dimensional vector E". The signal processing parameters $A_2, A_3, ..., A_N$ can be characterized as a one-dimensional vector A. The signal processing parameters $B_{11}, B_{12}, ..., B_{1N\text{-}1}; B_{21}, B_{22}, ..., B_{2N\text{-}1}; B_{31}, B_{32}, ..., B_{3N\text{-}1}; B_{N1}, B_{N2}, ..., B_{NN\text{-}1}$ can be characterized as a two dimensional matrix B. (In certain exemplary embodiments additional signal processing parameters can be represented in additional dimensions.) The multipliers 1001, 1002, 1003, ..., 100N and the scaling of the factors $B_{11}, B_{12}, ..., B_{1N\text{-}1}; B_{21}, B_{22}, ..., B_{2N\text{-}1}; B_{31}, B_{32}, ..., B_{3N\text{-}1}; B_{N1}, B_{N2}, ..., B_{NN\text{-}1}$ can characterized as implementing matrix algebra. Accordingly, solving equations to set the various signal processing parameters and implementing the resulting equations can proceed with well known linear algebra techniques available to and understood by those of ordinary skill in the art having benefit of this disclosure.

Any residual encoding present on an electrical signal 111, 112, 113, ..., 11N is sufficiently low enough so that the CDRs 625 (see FIG. 6) can recover data with no bit errors (or an acceptably low bit error rate). Thus, each CDR 625 can address or clean up any residual or extraneous encoding or signal artifacts.

In certain exemplary embodiments, the receiver 100 comprises multiple one of the signal processing circuits 275", such as one for each optical signal group as discussed above. In certain exemplary embodiments, the electrical circuit 275" comprises fixed or variable delays, phase shifters, or timing devices to maintain synchronization between the various signal paths in support of removing extraneous or unwanted encoding. In certain exemplary embodiments, the multipliers 1001, 1002, 1003, ..., 100N are positioned at the downstream end of the signal processing circuit 275" rather than prior to the subtractions. In certain exemplary embodiments, the multipliers 1001, 1002, 1003, ..., 100N are not present in the circuit.

Accordingly, the signal processing circuit 275" can handle an arbitrary number of WDM, CWDM, and/or DWDM optical signals. And, the receiver 100 can extract or recover data from each WDM, CWDM, and/or DWDM optical signal with cost effective optics, thus economically supporting a wide range of optical networking applications.

Technology for optical communication has been described so as to enable one of ordinary skill in the art to make and use the technology without undue experimentation. From the description, it will be appreciated that an embodiment of the present invention overcomes limitations of the prior art. Those skilled in the art will appreciate that the present invention is not limited to any specifically discussed application or implementation and that the embodiments described herein are illustrative and not restrictive. From the description of the exemplary embodiments, equivalents of the elements shown herein will suggest themselves to those skilled in the art, and ways of constructing other embodiments of the present invention will appear to ordinary practitioners of the art. Therefore, the scope of the present invention is to be limited only by the accompanying claims.

What is claimed is:

1. A communication method, comprising the steps of:
   illuminating each of a first detector and a second detector with a first optical signal carrying first information at a first wavelength and a second optical signal carrying second information at a second wavelength, wherein substantial portions of the first optical signal and the second optical signal are intentionally incident upon each of the first detector and the second detector, and
   processing electrical signals output by the first detector and the second detector by:
      applying an amplified version of one of the electrical signals to another one of the electrical signals; and
      applying an amplified version of the another one of the electrical signals to the one of the electrical signals; and
   determining the first information and the second information in response to the processed electrical signals.

2. The method of claim 1, wherein the illuminating step comprises:
   illuminating the first detector with a first predetermined amount of the first optical signal;
   illuminating the second detector with a second predetermined amount of the first optical signal;
   illuminating the first detector with a first predetermined amount of the second optical signal; and
   illuminating the second detector with a second predetermined amount of the second optical signal.

3. The method of claim 1, wherein processing the electrical signals output by the first detector and the second detector further comprises:
   transforming the electrical signals from being substantially unintelligible to a clock and data recovery device electrically coupled to the first detector and the second detector to being received by the clock and data recovery device as substantially free of bit errors.

4. A communication method, comprising the steps of:
   illuminating each of a first detector and a second detector with a first optical signal carrying first information at a first wavelength and a second optical signal carrying second information at a second wavelength by:
      directing different amounts of the first optical signal to first and second detectors; and
      directing different amounts of the second optical signal to the first and second detectors;
   processing electrical signals output by the first detector and the second detector by:
      applying a gain to each of the electrical signals;

evaluating signal quality of the processed electrical signals; and refining each of the applied gains according to the evaluation; and determining the first information and the second information in response to the processed electrical signals.

5. A communication method, comprising the steps of:

illuminating each of a first detector and a second detector with a first optical signal carrying first information at a first wavelength and a second optical signal carrying second information at a second wavelength by:

metering the first optical signal between the first detector and the second detector; and metering the second optical signal between the first detector and the second detector; and processing electrical signals output by the first detector and the second detector by:

essentially eliminating a contribution of the second optical signal from a first electrical signal output by the first detector; and essentially eliminating a contribution of the first optical signal from a second electrical signal output by the second detector; and determining the first information and the second information in response to the processed electrical signals.

6. An optical communication system, comprising:

a plurality of detectors, each operable to output a respective first electrical signal in response to receiving a plurality of incoming optical signals concurrently, wherein each of the incoming optical signals conveys distinct information in a different wavelength region; and a circuit, connected to outputs of the detectors, operable to produce second electrical signals in response to processing the first electrical signals, wherein each of the second electrical signals substantially carries the distinct information of a respective one of the incoming optical signals and substantially excludes the distinct information of a respective other one of the incoming optical signal, wherein the circuit comprises:

a plurality of amplifiers, each operable to apply an adjustable level of gain to a respective one of the first electrical signals; and a plurality of circuit branches, each operable to apply an adjustable amount of one of the first electrical signals to another one of the first electrical signals; and a controller operable to update the adjustable levels of gain and the adjustable amount based on at least one signal evaluation.

7. The system of claim 6, wherein each of the incoming optical signals is amplitude modulated, and wherein each of the first electrical signals comprises substantial signal amplitude features attributable to at least two of the incoming optical signals.

8. The system of claim 6, further comprising:

a waveguide, operable to transmit the plurality of incoming optical signals; and a filtering device, optically coupled between an output of the waveguide and the detectors, operable to:

feed a portion of one of the incoming optical signals to one of the plurality of detectors;

feed another portion of the one incoming optical signals to another one of the plurality of detectors;

feed a portion of another one of the incoming optical signals to the one of the plurality of detectors; and feed another portion of the another one of the incoming optical signals to the another one of the plurality of detectors.

9. The system of claim 6, wherein each of the plurality of detectors is operable to output a substantially different amount of electricity for a given intensity of incident light of a given wavelength.

10. The system of claim 6, wherein each of the plurality of detectors comprises a filter for transmitting different levels of each of the plurality of incoming signals to an optoelectronic element that is operable to convert light into electricity.

11. The system of claim 6, further comprising an optical device that is operable to meter predefined levels of each of the plurality of incoming optical signals to each of the plurality of detectors.

\* \* \* \* \*